US012214609B2

(12) United States Patent
Gozman et al.

(10) Patent No.: US 12,214,609 B2
(45) Date of Patent: Feb. 4, 2025

(54) THERMAL PAPER, AND METHODS AND SYSTEMS FOR FORMING THE SAME

(71) Applicant: G13 Innovation in Production Ltd, Netanya (IL)

(72) Inventors: Iakov Gozman, Netanya (IL); Dmitrii Derevitskii, Istanbul (TR)

(73) Assignee: G13 Innovation in Production Ltd, Netanya (IL)

( * ) Notice: Subject to any disclaimer, the term of this patent is extended or adjusted under 35 U.S.C. 154(b) by 0 days.

(21) Appl. No.: 18/593,913

(22) Filed: Mar. 3, 2024

(65) Prior Publication Data

US 2024/0399778 A1 Dec. 5, 2024

Related U.S. Application Data

(63) Continuation of application No. 18/203,740, filed on May 31, 2023, now Pat. No. 11,958,308.

(51) Int. Cl.

| | |
|---|---|
| ***B41M 5/36*** | (2006.01) |
| ***B41M 5/34*** | (2006.01) |
| ***B41M 5/42*** | (2006.01) |
| ***D21F 11/06*** | (2006.01) |
| ***D21H 23/56*** | (2006.01) |

(52) U.S. Cl.
CPC .............. *B41M 5/366* (2013.01); *B41M 5/34* (2013.01); *B41M 5/42* (2013.01); *D21F 11/06* (2013.01); *D21H 23/56* (2013.01); *B41M 2205/04* (2013.01); *B41M 2205/38* (2013.01)

(58) Field of Classification Search
CPC .......... B41M 5/366; B41M 5/34; B41M 5/42; B41M 2205/04; B41M 2205/38; D21F 11/06; D21H 23/56
See application file for complete search history.

(56) References Cited

U.S. PATENT DOCUMENTS

| | | | |
|---|---|---|---|
| 2,433,000 | A | 12/1947 | Manning |
| 2,770,835 | A | 11/1956 | Williams |
| 2,897,874 | A | 8/1959 | Stalego et al. |
| 3,607,588 | A | 9/1971 | Soehngen |
| 3,616,030 | A | 10/1971 | Jumentier |

(Continued)

FOREIGN PATENT DOCUMENTS

| | | |
|---|---|---|
| AU | 2020100846 | 7/2020 |
| CN | 1472373 | 2/2004 |

(Continued)

OTHER PUBLICATIONS

Functional principle Blue4est—Koehler Paper; The Structure of Blue4est Thermal Paper; retrieved from https://www.koehlerpaper.com/en/products/Thermal-paper/Functional-principle-Blue4est.php on May 28, 2023.

*Primary Examiner* — Jacob T Minskey
*Assistant Examiner* — Stephen M Russell
(74) *Attorney, Agent, or Firm* — PEARL COHEN ZEDEK LATZER BARATZ LLP

(57) ABSTRACT

A sheet for thermal printing is provided, which may include: a first layer including: a sheet material dyed in a specific color; and a second layer coextensive with the first layer and including a plurality of particles randomly and evenly arranged per a thickness unit and per an area unit of the second layer, the particles being at least partly transmissive to light in the visible light range.

19 Claims, 21 Drawing Sheets

(56) References Cited

U.S. PATENT DOCUMENTS

| | | | | |
|---|---|---|---|---|
| 3,839,139 | A | 10/1974 | Ito et al. | |
| 3,924,049 | A | 12/1975 | Truitt et al. | |
| 4,348,341 | A | 9/1982 | Furuya et al. | |
| 4,790,736 | A | 12/1988 | Keuchel | |
| 5,079,334 | A | 1/1992 | Epstein et al. | |
| 5,114,631 | A | 5/1992 | Nyssen et al. | |
| 5,173,356 | A | 12/1992 | Easton et al. | |
| 5,236,641 | A | 8/1993 | Allen et al. | |
| 5,242,633 | A | 9/1993 | Rook et al. | |
| 5,527,598 | A | 6/1996 | Cambell et al. | |
| 5,712,033 | A | 1/1998 | Gallagher et al. | |
| 6,143,675 | A * | 11/2000 | McCollam | B32B 27/065<br>427/195 |
| 6,210,801 | B1 | 4/2001 | Luo et al. | |
| 6,227,009 | B1 | 5/2001 | Cusick et al. | |
| 6,514,889 | B1 | 2/2003 | Theoret et al. | |
| 6,790,488 | B1 | 9/2004 | Nakajima et al. | |
| 6,872,440 | B1 | 5/2005 | Kiik et al. | |
| 7,582,240 | B2 | 9/2009 | Marin et al. | |
| 8,029,190 | B2 | 10/2011 | MacDonald et al. | |
| 9,149,747 | B2 | 10/2015 | Kitano | |
| 9,457,127 | B2 | 4/2016 | Martin et al. | |
| 9,393,449 | B2 * | 7/2016 | Endle | F16L 5/04 |
| 9,988,271 | B2 | 6/2018 | Lozano et al. | |
| 10,422,054 | B2 | 9/2019 | Lozano et al. | |
| 10,526,749 | B2 | 1/2020 | Milton et al. | |
| 10,736,985 | B2 | 8/2020 | Odermatt et al. | |
| 10,760,184 | B2 | 9/2020 | Seo et al. | |
| 2003/0118814 | A1 | 6/2003 | Workman, Jr. et al. | |
| 2004/0192145 | A1 | 9/2004 | Theoret et al. | |
| 2005/0056956 | A1 | 3/2005 | Zhao et al. | |
| 2005/0106391 | A1 | 5/2005 | Lawrence et al. | |
| 2007/0042662 | A1 | 2/2007 | Noelle et al. | |
| 2008/0173497 | A1 | 7/2008 | Kalinova et al. | |
| 2008/0230309 | A1 | 9/2008 | Fox et al. | |
| 2009/0102100 | A1 | 4/2009 | Hellring et al. | |
| 2010/0148405 | A1 | 6/2010 | Sumida et al. | |
| 2010/0182188 | A1 | 7/2010 | Kudo et al. | |
| 2011/0168440 | A1 | 7/2011 | Egami et al. | |
| 2012/0276332 | A1 | 1/2012 | Conolly et al. | |
| 2012/0090683 | A1 | 4/2012 | Uzoh et al. | |
| 2015/0111455 | A1 | 4/2015 | Huang et al. | |
| 2015/0354094 | A1 | 12/2015 | Parker et al. | |
| 2016/0168756 | A1 | 6/2016 | Gladish et al. | |
| 2017/0058451 | A1 | 3/2017 | Smith et al. | |
| 2017/0261384 | A1 | 9/2017 | Ueno | |
| 2017/0268132 | A1 | 9/2017 | Kilic et al. | |
| 2017/0306528 | A1 | 10/2017 | Seo et al. | |
| 2017/0327983 | A1 | 11/2017 | Nakahira et al. | |
| 2018/0130563 | A1 | 5/2018 | Sugita et al. | |
| 2018/0134003 | A1 | 5/2018 | Lee et al. | |
| 2019/0091967 | A1 | 3/2019 | Lee et al. | |
| 2019/0291493 | A1 | 9/2019 | Fisher et al. | |
| 2019/0308390 | A1 | 10/2019 | Bansal et al. | |
| 2020/0063349 | A1 * | 2/2020 | Parker | D21H 15/04 |
| 2020/0157715 | A1 | 5/2020 | Frey et al. | |
| 2020/0254395 | A1 | 8/2020 | Higashi et al. | |
| 2020/0283931 | A1 | 9/2020 | Abouraddy et al. | |
| 2021/0115603 | A1 | 4/2021 | Prevoteau et al. | |
| 2022/0049376 | A1 | 2/2022 | Martens et al. | |
| 2022/0055389 | A1 | 2/2022 | Boxhammer et al. | |
| 2022/0090300 | A1 | 3/2022 | Liu et al. | |
| 2022/0195629 | A1 | 6/2022 | Wu et al. | |
| 2022/0252770 | A1 | 8/2022 | Schmidt et al. | |

FOREIGN PATENT DOCUMENTS

| | | | |
|---|---|---|---|
| CN | 1696360 | | 11/2005 |
| CN | 107337353 | | 11/2007 |
| CN | 101220544 | | 7/2008 |
| CN | 201224821 | | 4/2009 |
| CN | 104553174 | | 4/2015 |
| CN | 105714476 | | 6/2016 |
| CN | 105951195 | | 9/2016 |
| CN | 106245146 | | 12/2016 |
| CN | 106634307 | | 5/2017 |
| CN | 107338642 | | 11/2017 |
| CN | 108035075 | | 5/2018 |
| CN | 108675645 | | 10/2018 |
| CN | 109518357 | | 3/2019 |
| CN | 107951794 | | 4/2019 |
| CN | 109733023 | | 5/2019 |
| CN | 110409057 | | 11/2019 |
| CN | 110527379 | | 12/2019 |
| CN | 111038039 | | 4/2020 |
| CN | 210781887 | | 6/2020 |
| CN | 111517644 | | 8/2020 |
| CN | 111945300 | | 11/2020 |
| CN | 113930897 | | 1/2021 |
| CN | 110468505 | | 3/2021 |
| CN | 112680803 | | 4/2021 |
| CN | 112760822 | | 5/2021 |
| CN | 110295403 | | 6/2021 |
| CN | 110295404 | | 8/2021 |
| CN | 113215670 | | 8/2021 |
| CN | 213881869 | | 8/2021 |
| CN | 113622082 | | 9/2021 |
| CN | 110711430 | | 10/2021 |
| CN | 112501784 | | 11/2021 |
| CN | 216107347 | | 3/2022 |
| CN | 216192897 | | 4/2022 |
| DE | 102004016934 | | 10/2005 |
| DE | 102019003795 | | 12/2020 |
| DE | 102019003796 | | 12/2020 |
| EP | 2993054 | | 3/2016 |
| EP | 4046813 | | 8/2022 |
| EP | 4063138 | | 9/2022 |
| FR | 2176050 | | 10/1973 |
| FR | 2845754 | | 4/2004 |
| JP | S6482696 | | 3/1989 |
| JP | H03223132 | | 10/1991 |
| JP | H09241954 | | 9/1997 |
| JP | 2000192360 | | 7/2000 |
| JP | 2001267783 | | 9/2001 |
| JP | 2005291825 | | 10/2005 |
| JP | 2015088535 | | 5/2015 |
| JP | 2020025093 | | 2/2020 |
| JP | 2022051287 | | 3/2022 |
| KR | 920008999 | B1 | 10/1992 |
| KR | 20050106168 | | 11/2005 |
| KR | 100780346 | | 11/2007 |
| KR | 20070118731 | | 12/2007 |
| KR | 20120000147 | | 1/2012 |
| KR | 20140002982 | | 1/2014 |
| KR | 20150106273 | | 9/2015 |
| KR | 20160081609 | | 7/2016 |
| KR | 20170027676 | | 3/2017 |
| KR | 20170028273 | | 3/2017 |
| KR | 20170028854 | | 3/2017 |
| KR | 101861038 | | 5/2018 |
| KR | 101929450 | | 12/2018 |
| KR | 20190131982 | | 11/2019 |
| KR | 102119478 | | 6/2020 |
| KR | 102149298 | | 8/2020 |
| KR | 102158145 | | 9/2020 |
| KR | 102207129 | | 1/2021 |
| KR | 102299371 | | 9/2021 |
| RU | 2689624 | | 5/2019 |
| TW | 201832755 | | 9/2018 |
| WO | WO 2001/11119 | | 2/2001 |
| WO | WO 2004/054799 | | 1/2004 |
| WO | WO 2004/051020 | | 6/2004 |
| WO | WO 2013/160134 | | 10/2013 |
| WO | WO 2015/009962 | | 1/2015 |
| WO | WO 2019/077883 | | 4/2019 |
| WO | WO 2021/1077848 | | 4/2021 |
| WO | WO 2022/262908 | | 12/2022 |

* cited by examiner

THERMAL PAPER, AND METHODS AND SYSTEMS FOR FORMING THE SAME

CROSS-REFERENCE TO RELATED APPLICATIONS

This application is a continuation of U.S. patent application Ser. No. 18/203,740 filed May 31, 2023, which is hereby incorporated by reference.

FIELD OF THE INVENTION

The present invention relates to the field of thermal printing, and more particularly, to paper for thermal printing.

BACKGROUND OF THE INVENTION

Typically, paper for thermal printing is coated with a material formulated to change color when exposed to heat. During the printing process, the thermal printer sends a pulse of heat onto the paper, causing molecules of the coating material to transform chemically changing from their colorless form to their colored form.

SUMMARY OF THE INVENTION

Some embodiments of the present invention may provide a sheet for thermal printing, which may include: a first layer including: a sheet material dyed in a specific color; and a second layer coextensive with the first layer and including a plurality of discrete particles randomly and evenly arranged per a thickness unit and per an area unit of the second layer, the particles being at least partly transmissive to light in the visible light range.

In some embodiments, the plurality of the particles cause all wavelengths of light passing through the second layer to evenly at least one of refract and reflect a plurality of times.

In some embodiments, at least one of refraction and reflection of the light passing through the second layer the plurality of times causing the second layer to appear white.

In some embodiments, upon heating of a selected region of the sheet, the particles in the selected region melt and fuse into a continuous portion.

In some embodiments, light passing through the continuous portion at least one of refracts and reflects only upon entering into the continuous portion and exiting from the continuous portion.

In some embodiments, the first layer reflects the wavelength of the specific color, and wherein at least one of refraction and reflection of the light passing through the continuous portion only upon entering and exiting the continuous portion causes the selected to appear in the specific color.

In some embodiments, the second layer is dyed in a specific color, the specific color of the second layer being different from the specific color of the first layer.

In some embodiments, the sheet includes a third layer coextensive with the second layer and including a plurality of particles evenly arranged per a thickness unit and per an area unit of the third layer, the particles of the third layer being at least partly transmissive to light in the visible light range.

In some embodiments, upon heating of a selected region of the sheet, the particles of the third layer in the selected region melt and fuse a continuous portion before the particles of the second layer in the selected region melt and fuse into the continuous portion.

In some embodiments, at least a portion of the particles are fibers.

In some embodiments, all the particles are fibers.

In some embodiments, the fibers are randomly intertwined and evenly arranged per the thickness unit and per the area unit of the second layer.

In some embodiments, the particles have flattened cross-section.

In some embodiments, the sheet material of the first layer is selected from a paper, a film and a canvas.

In some embodiments, the particles of the second layer are formed from a polymeric material.

In some embodiments, a material from which the particles are formed has a melting temperature within a range of 46 to 48° C.

In some embodiments, a material from which the particles are formed has a dropping point temperature within a range of 54 to 56° C.

In some embodiments, the thickness of the second layer is within a range of 8 to 10 μm.

In some embodiments, thickness of the first layer is within a range of 0.1 to 1,000 μm.

Some embodiments of the present invention may provide a method of forming a sheet for thermal printing, which may include: forming fibers from a piece of material; braking the fibers to form particles; preparing a dispersion including liquid and the particles; applying a layer of the dispersion with the liquid and the particles on a sheet material; drying the sheet material and the applied layer; and adhering the applied layer to the sheet material to form the sheet for thermal printing, wherein the particles in the adhered layer are randomly and evenly arranged per a thickness unit and per an area unit of the layer.

In some embodiments, the piece of material is formed of a polymeric material.

In some embodiments, forming the fibers is by an extrusion head.

In some embodiments, the method includes, prior to preparing the dispersion, refining the size of the particles.

In some embodiments, applying the layer of the dispersion on the sheet material is by a rotatable shaft, the rotatable shaft being partly placed within a container containing the dispersion.

In some embodiments, the method includes, prior to drying, removing the excess dispersion from the sheet material.

In some embodiments, removing is by an air knife.

In some embodiments, drying is until the moisture level of the sheet material and the applied layer reaches the natural moisture level of the sheet material.

In some embodiments, adhering is by a calendaring device.

In some embodiments, the sheet material is selected from a paper, a film and a canvas.

In some embodiments, the thickness of the adhered layer is within a range of 8 to 10 μm.

Some embodiments of the present invention may provide a sheet for thermal printing, which may include: a first layer including: a sheet material dyed in a specific color; and a second layer coextensive with the first layer and including a plurality of randomly intertwined fibers, the fibers being evenly arranged per a thickness unit and per an area unit of the second layer and being at least partly transmissive to light in the visible light range.

In some embodiments, the plurality of the fibers cause all wavelengths of light passing through the second layer to evenly at least one of refract and reflect a plurality of times.

In some embodiments, at least one of refraction and reflection of the light passing through the second layer the plurality of times causing the second layer to appear white.

In some embodiments, upon heating of a selected region of the sheet, the fibers in the selected region melt and fuse into a continuous portion.

In some embodiments, light passing through the continuous portion at least one of refracts and reflects only upon entering into the continuous portion and exiting from the continuous portion.

In some embodiments, the first layer reflects the wavelength of the specific color, and wherein at least one of refraction and reflection of the light passing through the continuous portion only upon entering and exiting the continuous portion causes the selected to appear in the specific color.

In some embodiments, the second layer is dyed in a specific color, the specific color of the second layer being different from the specific color of the first layer.

In some embodiments, a third layer coextensive with the second layer and including a plurality of randomly intertwined fibers, the fibers of the third layer being evenly arranged per a thickness unit and per an area unit of the third layer and being at least partly transmissive to light in the visible light range.

In some embodiments, wherein upon heating of a selected region of the sheet, the fibers of the third layer in the selected region melt and fuse a continuous portion before the fibers of the second layer in the selected region melt and fuse into the continuous portion.

In some embodiments, the fibers have flattened cross-section.

In some embodiments, the sheet material of the first layer is selected from a paper, a film and a canvas.

In some embodiments, the fibers of the second layer are formed from a polymeric material.

In some embodiments, a material from which the fibers are formed has a melting temperature within a range of 46 to 48° C.

In some embodiments, a material from which the fibers are formed has a dropping point temperature within a range of 54 to 56° C.

In some embodiments, the thickness of the second layer is within a range of 8 to 10 μm.

In some embodiments, thickness of the first layer is within a range of 0.1 to 1,000 μm.

Some embodiments of the present invention may provide a method of forming a sheet for thermal printing, which may include: forming a plurality of fibers from a piece of material; arranging the fibers in a layer by passing gas on opposing sides of the layer in a conduit, the fibers being randomly intertwined and evenly arranged per a thickness unit and per an area unit of the layer; placing the layer of the fibers on a sheet material; and adhering the layer of the fibers to the sheet material to form the sheet for thermal printing.

In some embodiments, forming the plurality of fibers is by an extrusion head.

In some embodiments, arranging the fibers in the layer is further by a shaft rotatable about an axis, the shaft including a plurality of needles projecting from a surface of the shaft.

In some embodiments, wherein the shaft includes a plurality of rings arranged along the axis of the shaft adjacent to each other, each of the rings includes a subset of the plurality of needles, and the method includes rotating at least one of the plurality of the rings at a different rotational speed and/or in a different direction as compared to adjacent rings of the plurality of rings.

In some embodiments, adhering is by a calendaring device.

Some embodiments of the present invention may provide a method of forming a sheet for thermal printing, which may include: forming a plurality of fibers from a piece of material; placing the fibers in a liquid; simultaneously squeezing the liquid from the fibers and arranging the fibers in a layer, the fibers being randomly intertwined and evenly arranged per a thickness unit and per an area unit of the layer; placing the layer of the fibers on a sheet material; and adhering the layer of the fibers to the sheet material to form the sheet for thermal printing.

In some embodiments, forming the plurality of fibers is performed by an extrusion head.

In some embodiments, squeezing and arranging the fibers in the layer is by pressing the fibers against a rotatable mesh shaft.

In some embodiments, adhering is by a calendaring device.

BRIEF DESCRIPTION OF THE DRAWINGS

For a better understanding of embodiments of the invention and to show how the same can be carried into effect, reference is made, purely by way of example, to the accompanying drawings in which like numerals designate corresponding elements or sections throughout. In the accompanying drawings.

Figure 1A:
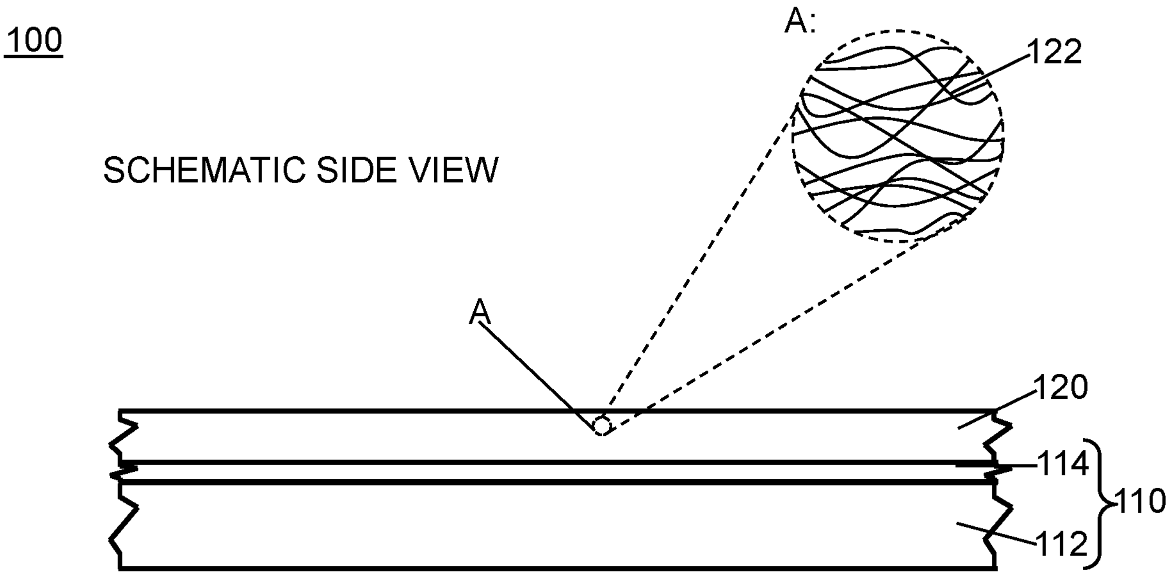
FIG. 1A is a schematic illustration of a side view of a sheet for thermal printing including a layer formed of a plurality of fibers, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Embodiments of the present invention may provide a sheet for thermal printing. The sheet for thermal printing may include a first layer and a second (e.g., coating) layer.

The first layer may include a sheet material selected from a group including a paper, a film, a canvas or any other suitable sheet material. The first layer may be dyed in a specific color. For example, the first layer may include a dye of the specific color disposed on a surface of the sheet material of the first layer.

The second layer may include a plurality of particles (e.g., discrete particles). The particles may include fibers, non-fiber particles or both (e.g., as described hereinbelow). The particles may be formed of polymeric material. The particles may be randomly and evenly (or substantially evenly) arranged per a thickness unit of the second layer. The particles may be randomly and evenly (or substantially evenly) arranged per an area unit of the second layer. The particles may be at least partly transmissive to light in the visible light range. "Evenly arranged per a thickness unit and/or per an area unit of the second layer" is not used herein with statistical or mathematical precision. Some variation in local density is permitted within the meaning of this phrase without departing from the scope of the invention, provided such variation is not substantial, noticeable or does not alter the performance of one area compared to another of the sheet.

The randomly and evenly (or substantially evenly) arranged particles (e.g., discrete particles, intertwined fibers or a combination thereof) of the second layer may cause all (or substantially all) wavelengths of light of the visible light range passing through the second layer to evenly (or substantially evenly) reflect and/or refract a plurality of times. The even (or substantially even) reflection and/or refraction of all (or substantially all) wavelengths of the light passing through the second layer may cause the second layer to appear white (or substantially white). "All wavelengths of light" refers to those wavelengths having a material effect on the performance of the sheet. Likewise, light reflecting or refracting "evenly" means only that light is not reflected or refracted preferentially at a single wavelength or at particular wavelength bands, especially in a way that would cause a noticeable change in a visible appearance of the sheet.

When a thermal printer sends a pulse of heat onto a selected region of the second layer of the sheet and heats the selected region to a melting temperature of a material from which the particles are formed, the particles in the selected heated region may fuse into one continuous portion. The continuous portion may be at least partly transmissive to light in the visible light range. Light passing through the continuous transparent (or substantially transparent) portion of the selected heated region of the second layer may reflect and/or refract twice-when entering the second layer and when exiting the second layer. The first layer dyed in the specific color may absorb all (or substantially all) wavelengths of light except the wavelength of the specific color. The first layer may reflect the wavelength of the specific color. Accordingly, the selected heated region may appear in the specific color (or substantially in the specific color).

Embodiments of the present invention may provide methods and systems for forming the sheet for thermal printing disclosed herein.

Unlike in prior art paper for thermal printing that includes a monolithic layer of coating material applied on top of a paper, the disclosed sheet for thermal printing includes a coating layer (e.g., second layer) with a plurality of discrete particles. Usage of discrete particles may significantly reduce the amount of raw material used to form the coating layer as compared to the amount of raw material that would be required if the coating layer would be formed of a monolithic material like in prior art paper for thermal printing. The coating layer of the disclosed sheet for thermal printing with a plurality of discrete particles may be formed at significantly higher speed as compared to speed of formation of monolithic coating layer of prior art paper for thermal printing, thus increasing productivity and reducing production costs as compared to prior art. The disclosed methods and systems of forming sheets for thermal printing including a coating layer with a plurality of discrete particles may consume significantly less energy and time per an area unit of the product as compared to methods and systems of forming prior art paper for thermal printing.

Reference is made to FIG. 1A, which is a schematic illustration of a side view of a sheet 100 for thermal printing, sheet 100 including a layer 120 formed of a plurality of fibers 122, according to some embodiments of the invention.

Figure 1B:
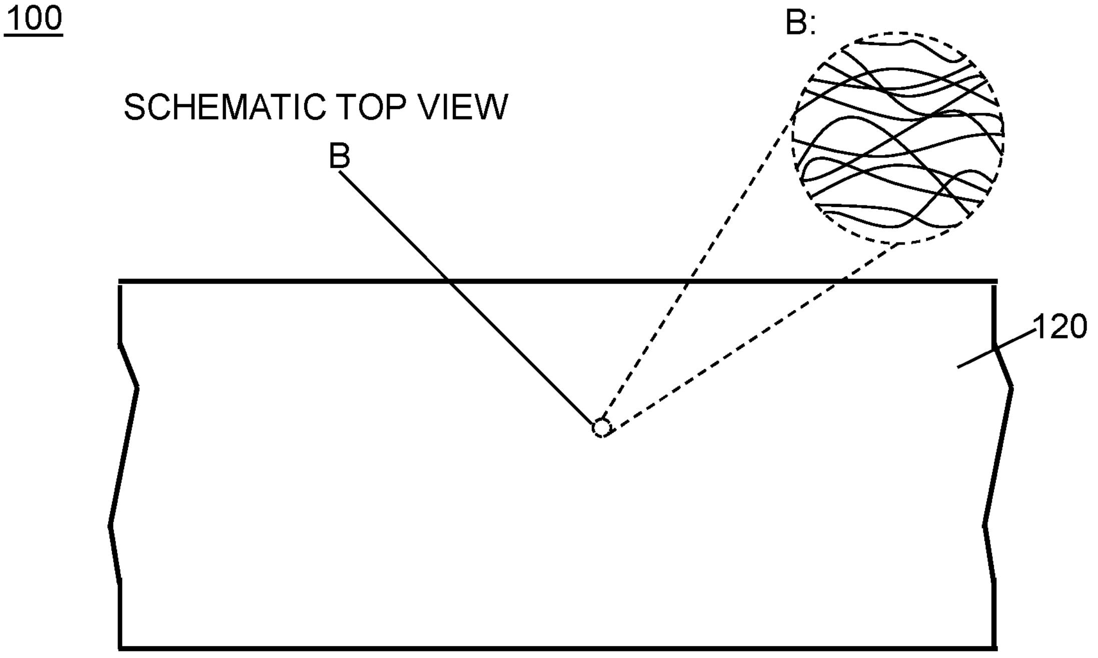
FIG. 1B is a schematic illustration of a top view of the sheet for thermal printing of FIG. 1A, according to some embodiments of the invention.

Reference is also made to FIG. 1B, which is a schematic illustration of a top view of sheet 100 of FIG. 1A, according to some embodiments of the invention.

Sheet 100 for thermal printing may include a first layer 110 and a second layer 120.

First layer 110 may include a sheet material 112. Sheet material 112 may include a paper, a film, a canvas or any other suitable sheet material. First layer 110 may be dyed in a specific color. For example, first layer 110 may include a dye 114 of the specific color disposed on a surface of sheet material 112 of first layer 110 (e.g., as shown in FIG. 1A). Dye 114 may be applied using, for example, rotogravure, flexo printing, offset printing, vacuum deposition or any other suitable method. The thickness of first layer 110 may be within a range of, for example, 0.1 to 1,000 μm. In other examples, the thickness of first layer 110 may be more than 1,000 μm.

Second layer 120 may be coextensive with first layer 110. Second layer 120 may be disposed on a surface of first layer 110. Second layer 120 may include a plurality of fibers (e.g., threads) 122. Fibers 122 may have an aspect ratio (e.g., a ratio of fiber length to fiber thickness (e.g., diameter)) of more than one (1), for example 2:1, 3:1. 4:1, 1000:1 or any other suitable value. Second layer 120 may have a thickness within a range of, for example, 8 to 12 μm. Each of fibers 122 may have a thickness of, for example, 3 μm or less. Fibers 122 may be intertwined. Fibers 122 may be randomly intertwined. Fibers 122 may be evenly (or substantially evenly) arranged per a thickness unit of second layer 120 (e.g., as schematically shown in FIG. 1A). For example, the number of fibers 122 per thickness unit of second layer 120 may be 10,000 fibers/mm. In other examples, the number of fibers per thickness unit of second layer 120 may be different than 10,000 fibers/mm. Fibers 122 may be evenly (or substantially evenly) arranged per an area unit of second layer 120 (e.g., as schematically shown in FIG. 1B). For example, the number of fibers 122 per area unit of second layer 120 may be within a range of 10,000 to 12,000 fibers/mm$^2$. Each of fibers 122 may have an elongated shape. Each of fibers 122 may have a circular, an oval, a polygonal and/or a flattened cross-section. Fibers 122 may be formed of a material having a melting temperature within a range of, for example, 46° to 48° C. Fibers 122 may be formed of a material having a dropping point temperature within a range of, for example, 54° to 56° C. Fibers 122 may be formed of a material that has a coefficient of refraction of light that is different from the coefficient of refraction of light of air. For example, fibers 122 may be formed of polymeric material such as High Density Polyethylene (HDPE), Polyethylene terephthalate (PET), sorbitan, $SiO_2$ and/or derivatives of $SiO_2$, or any other suitable polymeric material. Fibers 122 of second layer 120 may be at least partly transmissive to light in the visible light range.

Figure 1C:
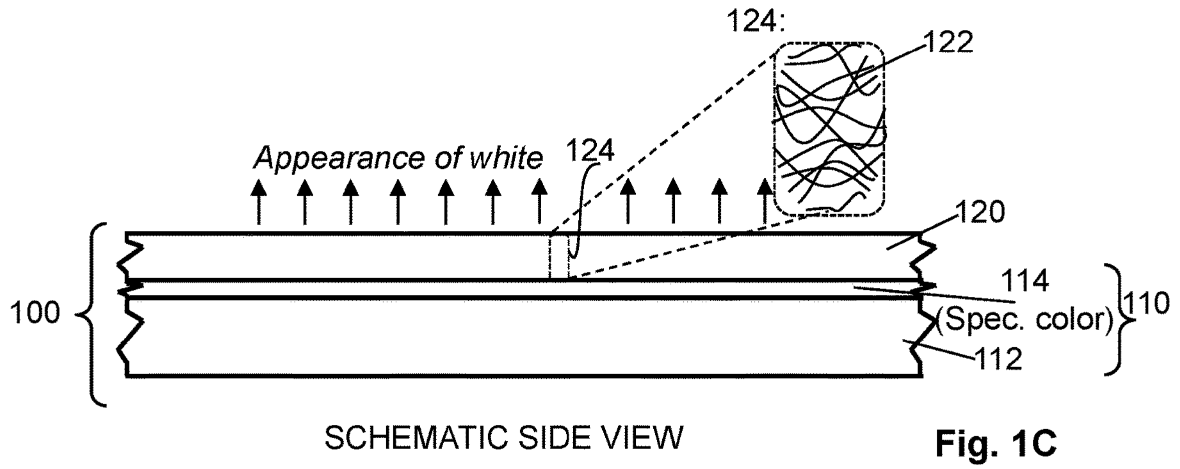
FIGS. 1C, 1D and 1E are schematic illustrations of the sheet of FIGS. 1A-1B in a thermal printing operation, according to some embodiments of the invention.
Figure 1D:
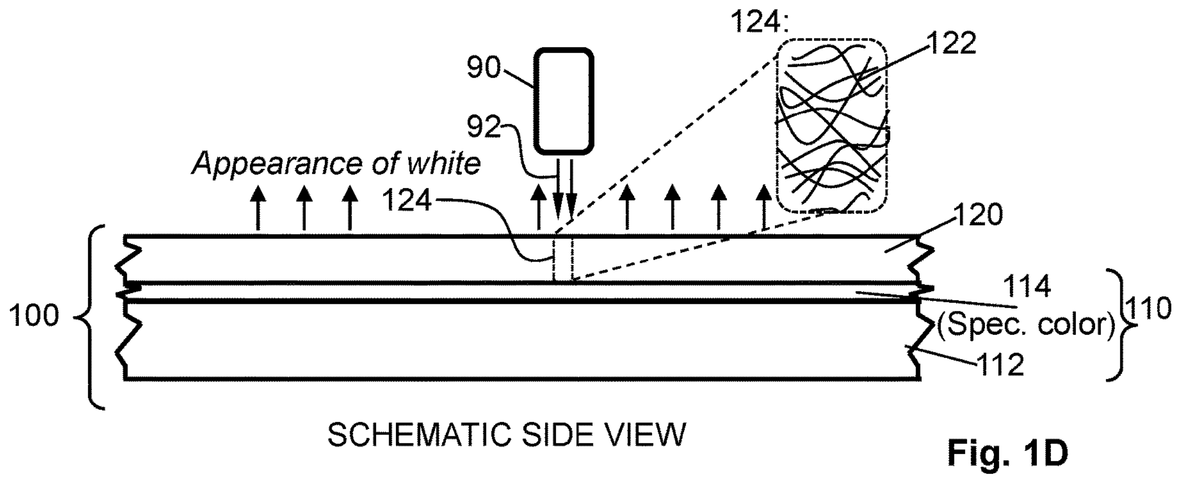
Figure 1E:
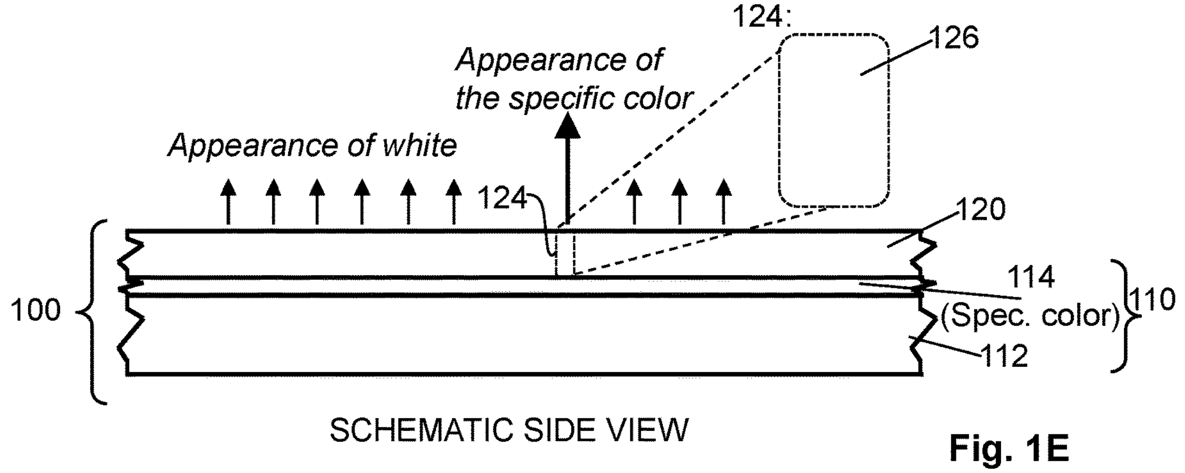

Reference is made to FIGS. 1C, 1D and 1E, which are schematic illustrations of sheet 100 of FIGS. 1A-1B in a thermal printing operation, according to some embodiments of the invention. FIGS. 1C, 1D and 1E show a schematic side view of sheet 100.

When light in the visible light range is passing through second layer 120 of sheet 100, intertwined fibers 122 of second layer 120 may cause all (or substantially all) wavelengths of the light to evenly (or substantially evenly) reflect and/or refract a plurality of times. For example, for second layer 120 having the thickness ranging within 8 to 10 μm, the number of fibers per the thickness unit of second layer 120 of 10,000 fibers/mm and/or the number of fibers per the area unit of second layer of 10,000-12,000 fibers/mm$^2$, the light passing through second layer 120 may reflect and/or refract between 10,000 to 12,000 times. The even (or substantially even) reflection and/or refraction of all (or substantially all) wavelengths of the light passing through second layer 122 the plurality of times may cause second layer 122 to appear white (or substantially white), for example as schematically indicated in FIGS. 1C, 1D and 1E.

When a thermal printer 90 sends a pulse of heat 92 onto a selected region 124 of second layer 120 of sheet 100 and heats selected region 124 to the melting temperature of the material from which fibers 122 are formed (e.g., as schematically indicated in FIG. 1D), fibers 122 in selected heated region 124 may fuse into one continuous portion 126 (e.g., as schematically indicated in FIG. 1E). Continuous portion 126 may be at least partly transmissive to light in the visible light range. Light passing through continuous portion 126 of selected heated region 124 of second layer 120 may reflect and/or refract twice-when entering second layer 120 and when exiting second layer 120. First layer 110 dyed in the specific color may absorb all (or substantially all) wavelengths of the light except the wavelength of the specific color. First layer 110 may reflect the wavelength of the specific color. Accordingly, selected heated region 124 of second layer 120 of sheet 120 may appear in the specific color (or substantially in the specific color) on sheet 100, for example as schematically indicated in FIG. 1E.

Figure 2:
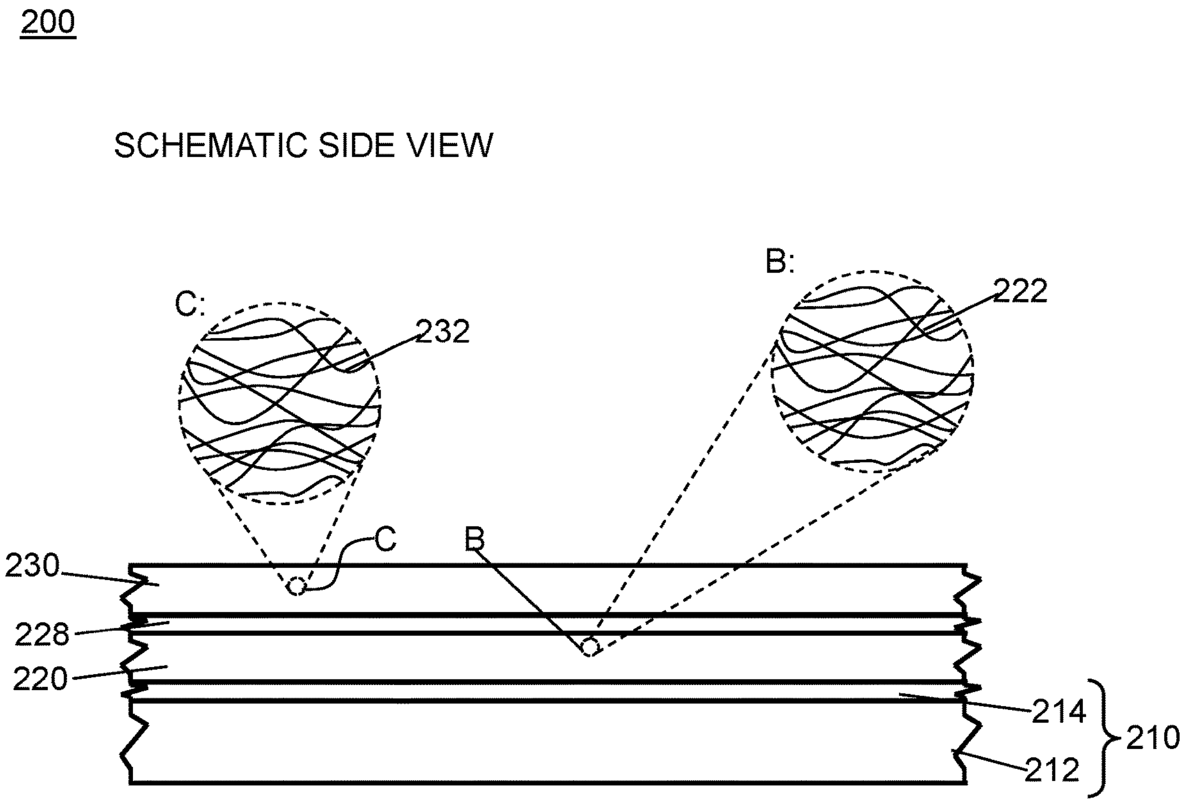
FIG. 2 is a schematic illustration of a side view of a sheet for thermal printing, including two layers each formed a plurality of fibers, according to some embodiments of the invention.

Reference is made to FIG. 2, which is a schematic illustration of a side view of sheet 200 for thermal printing, sheet 200 including two layers 220, 230 formed of a plurality of fibers, according to some embodiments of the invention.

Sheet 200 for thermal printing may include a first layer 210, a second layer 220 and a third layer 230. First layer 210 and second layer 220 may be dyed in different colors (e.g., as described hereinbelow) thus allowing colored thermal printing.

First layer 210 may include a sheet material 212. Sheet material 212 that may include a paper, a film, a canvas or any other suitable sheet material. First layer 210 may be dyed in a first specific color. For example, first layer 210 may include a dye 214 of the first specific color disposed on a surface of sheet material 212 of first layer 210. First layer 210 may be similar to first layer 110 described hereinabove.

Second layer 220 may be coextensive with first layer 210. Second layer 220 may be disposed on a surface of first layer 210. Second layer 220 may include a plurality of intertwined (e.g., randomly intertwined) fibers (e.g., threads) 222 (e.g., as described hereinabove with respect to fibers 122). Second layer 220 may be dyed in a second specific color. For example, a dye 228 of the second specific color may be disposed on a surface of second layer 220. The second specific color of second layer 220 may be different from the first specific color of first layer 210.

Third layer 230 may be coextensive with second layer 220. Third layer 230 may be disposed on a surface of second layer 220. Third layer 230 may include a plurality of intertwined (e.g., randomly intertwined) fibers (e.g., threads) 232 (e.g., as described hereinabove with respect to fibers 122). Fibers 232 of third layer 230 may be formed of a material having the melting temperature that is different from the melting temperature of the material from which fibers 222 of second layer 220 are formed.

Fibers 232 of third layer 230 may melt before fibers 222 of second layer when a pulse of heat is sent onto sheet 200. The number of fibers 222 in second layer 220 and fibers 232 in third layer 230 and/or the density of fibers 222 in second layer 220 and fibers 232 in third layer 230 and/or the spatial arrangement of fibers 222 in second layer 220 and fibers 232 in third layer 230 and/or any other suitable parameter of sheet 200 may be set to cause fibers 232 of third layer 230 to melt before fibers 222 of second layer when a pulse of heat is applied to sheet 200.

In operation, a thermal printer may send a pulse of heat onto a selected region of sheet 200 to heat third layer 230 in the selected region and cause the selected region to appear substantially in the second specific color (e.g., as described above with respect to FIGS. 1C, 1D and 1E). If desired, the power of the heat pulse may be increased to heat second layer 220 in the selected region and cause the selected region to appear substantially in the first specific color and/or in a combination of the first specific color and the second specific color (e.g., as described above with respect to FIGS. 1C, 1D and 1E).

While two layers 220, 230 with fibers 222, 232, respectively, are shown, sheet 200 may include any suitable number of layers with fibers (e.g., three or more layers) wherein each of the layers may be dyed in a different color as compared to the other layers.

Figure 3A:
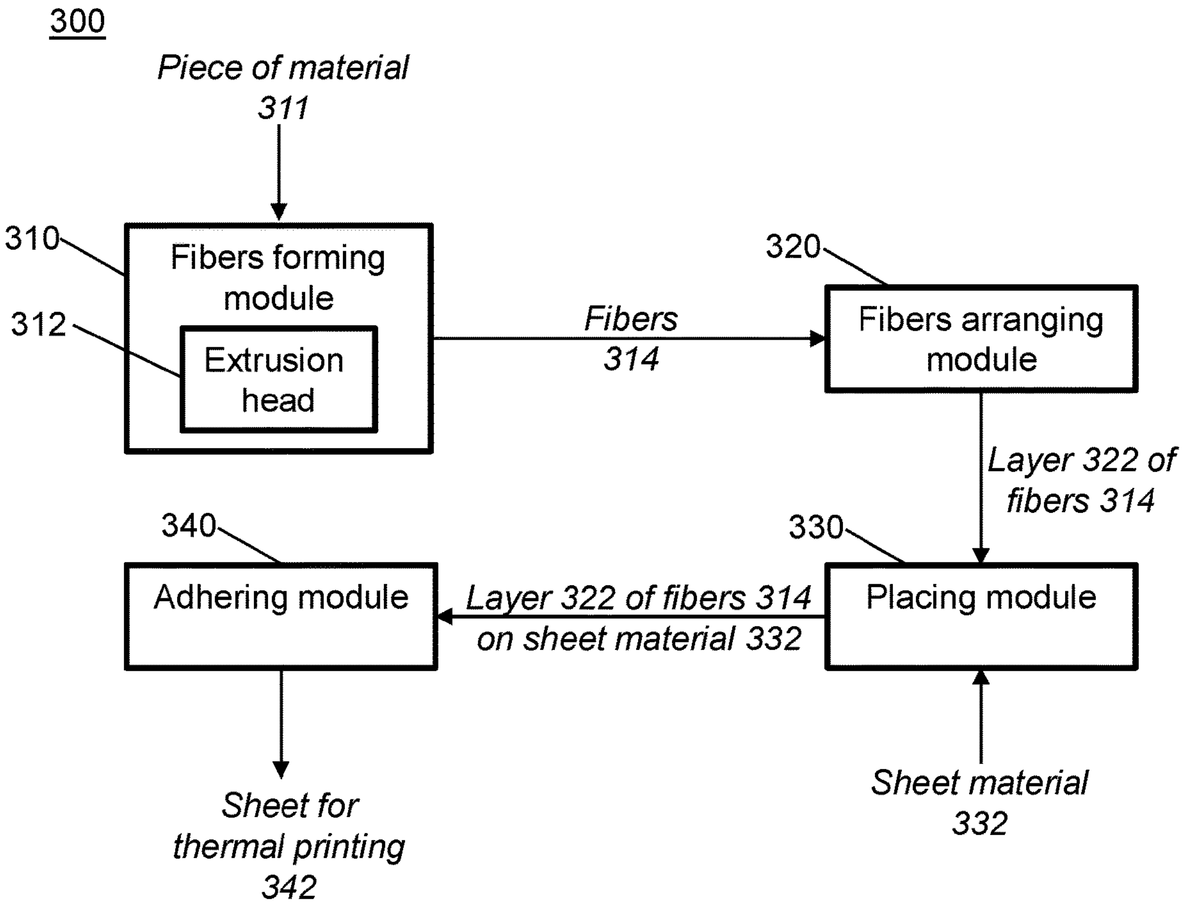
FIG. 3A is a block diagram of a system for forming a sheet for thermal printing in a gaseous medium, the sheet including a layer formed of a plurality of fibers, according to some embodiments of the invention.

Reference is made to FIG. 3A, which is a block diagram of a system 300 for forming a sheet 342 for thermal printing in a gaseous medium, sheet 342 including a layer formed of a plurality of fibers 314, according to some embodiments of the invention.

System 300 may be used to form sheet 100 and/or sheet 200 described hereinabove.

System 300 may include a fibers forming module 310. Fibers forming module 310 may receive a piece of material 311. Fibers forming module 310 may operate an extrusion head 312. Extrusion head 312 may form a plurality of fibers 314 (e.g., such as fibers 122, 222, 232 described herein) from piece of material 311. Piece of material 311 may, for example, include polymeric material such as High Density Polyethylene (HDPE), Polyethylene terephthalate (PET), sorbitan, $SiO_2$ and/or derivatives of $SiO_2$, or any other suitable polymeric material. An example of extrusion head 312 is described below with respect to FIGS. 3B-3C.

System 300 may include a fibers arranging module 320. Fibers arranging module 320 may receive fibers 314 from fibers forming module 310. Fibers arranging module 320 may arrange fibers 314 in a layer 322 in which fibers 314 are randomly intertwined and evenly (or substantially evenly) arranged per a thickness unit and per an area unit of the layer (e.g., such as second layer 120, 220 and/or third layer 230 described herein). An example of fibers arranging module 320 is described below with respect to FIGS. 3D, 3E and 3F.

System 300 may include an application module 330. Application module 330 may place layer 322 of fibers 314 on a sheet material 332 (e.g., such as sheet material 112 described hereinabove). Sheet material 332 may include a paper, a film, a canvas or any other suitable sheet material. An example of application module 330 is described below with respect to FIGS. 3G.

System 300 may include a fibers layer adhering module 340. Fibers layer adhering module 340 may adhere layer 322 of fibers 314 to sheet material 330 to provide a sheet 342 for thermal printing (e.g., such as sheet 100 and/or 200 described herein). An example of adhering module 340 is described below with respect to FIGS. 3H.

Figure 3B:
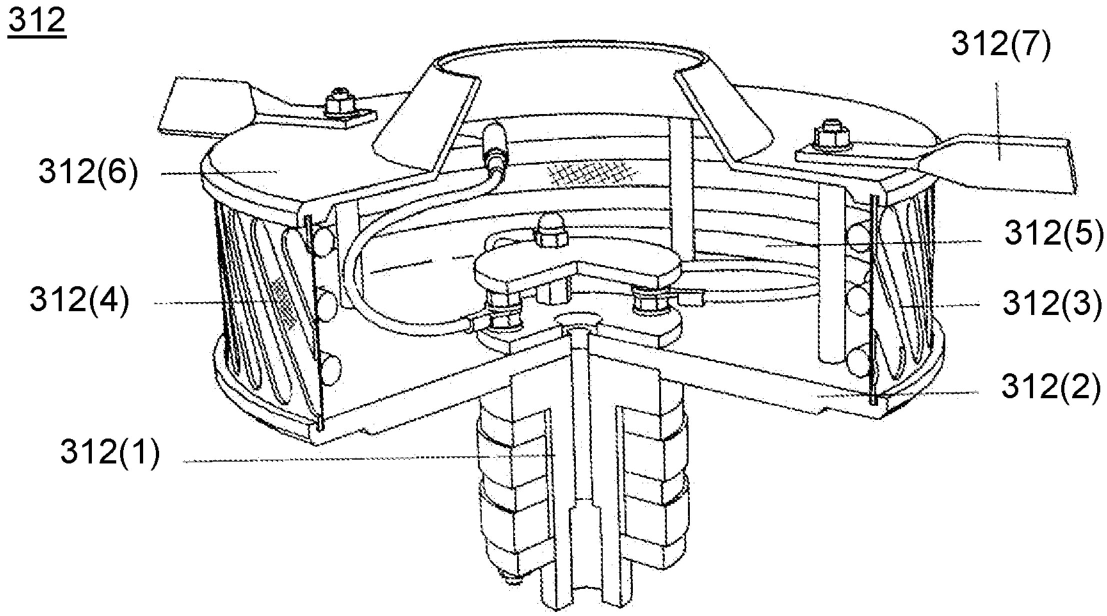
FIG. 3B is a three-dimensional (3D) diagram of an extrusion head of the system of FIG. 3A, according to some embodiments of the invention.

Reference is also made to FIG. 3B, which is a three-dimensional (3D) diagram of an extrusion head 312 of system 300 of FIG. 3A, according to some embodiments of the invention.

Figure 3C:
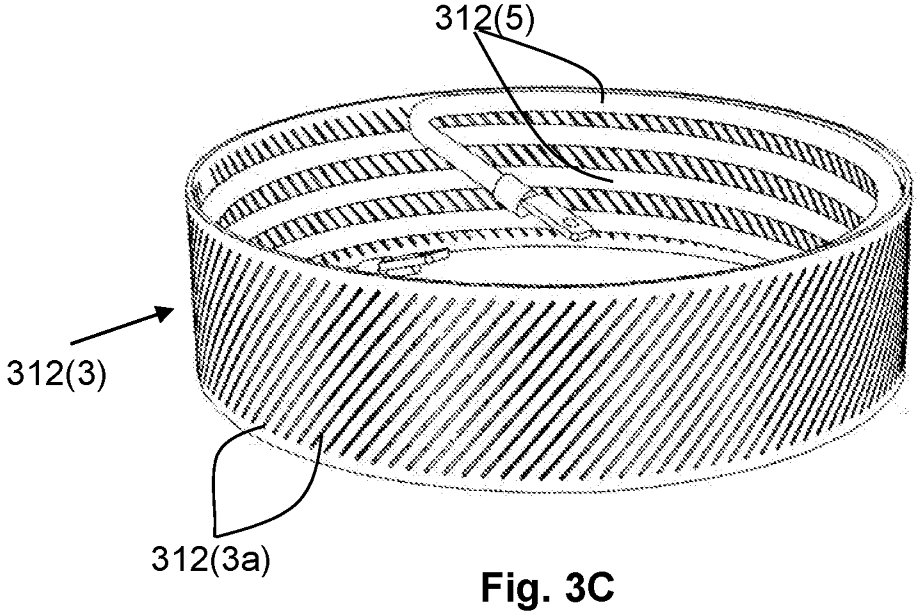
FIG. 3C is a 3D diagram of components of the extrusion head of FIG. 3B, according to some embodiments of the invention.

Reference is also made to FIG. 3C, which is a 3D diagram of components of extrusion head 312 of FIG. 3B, according to some embodiments of the invention.

Extrusion head 312 may rotate at a rotational speed within a range of, for example, 2,500 to 3,500 rounds per minute. Extrusion head 312 may be heat to a desired temperature within a range of, for example, 0 to 3,000° C. Fibers 314 may be formed by rotating extrusion head 312 under the action of centrifugal force.

Extrusion head 312 may include a shaft 312(1). Extrusion head 312 may include a base 312(2). Base 312(2) may be disposed at the end of shaft 312(1). Extrusion head 312 may include a diffuser 312(3). Diffuser 312(3) may be disposed along a periphery of base 312(2). Diffuser 312(3) may include slots 312(3*a*). Slots 312(3*a*) may be parallel to each other. Slots **312(3*a*) may be inclined relative to a longitudinal axis of shaft 312(1). Extrusion head 312 may include a metal mesh 312(4) disposed along the surface of diffuser 312(3). Extrusion head 312 may include an electric heater (e.g., tubular electric heater) 312(5) disposed within diffuser 312(3). Extrusion head 312 may include a cover 312(6) that may cover diffuser 312(3). Extrusion 312 may include radial petals 312(7) disposed on cover 312(6). Any other suitable extrusion heads may be used to form fibers 314 from piece of material 311**.

Figure 3D:
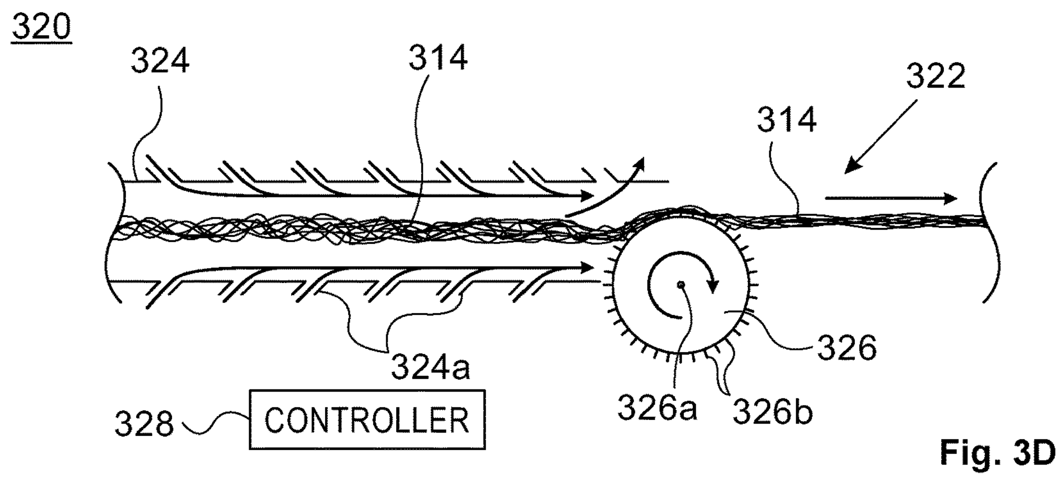
FIGS. 3D and 3E are schematic illustrations of a fibers arranging module of the system of FIG. 3A, according to some embodiment some embodiments of the invention.
Figure 3E:
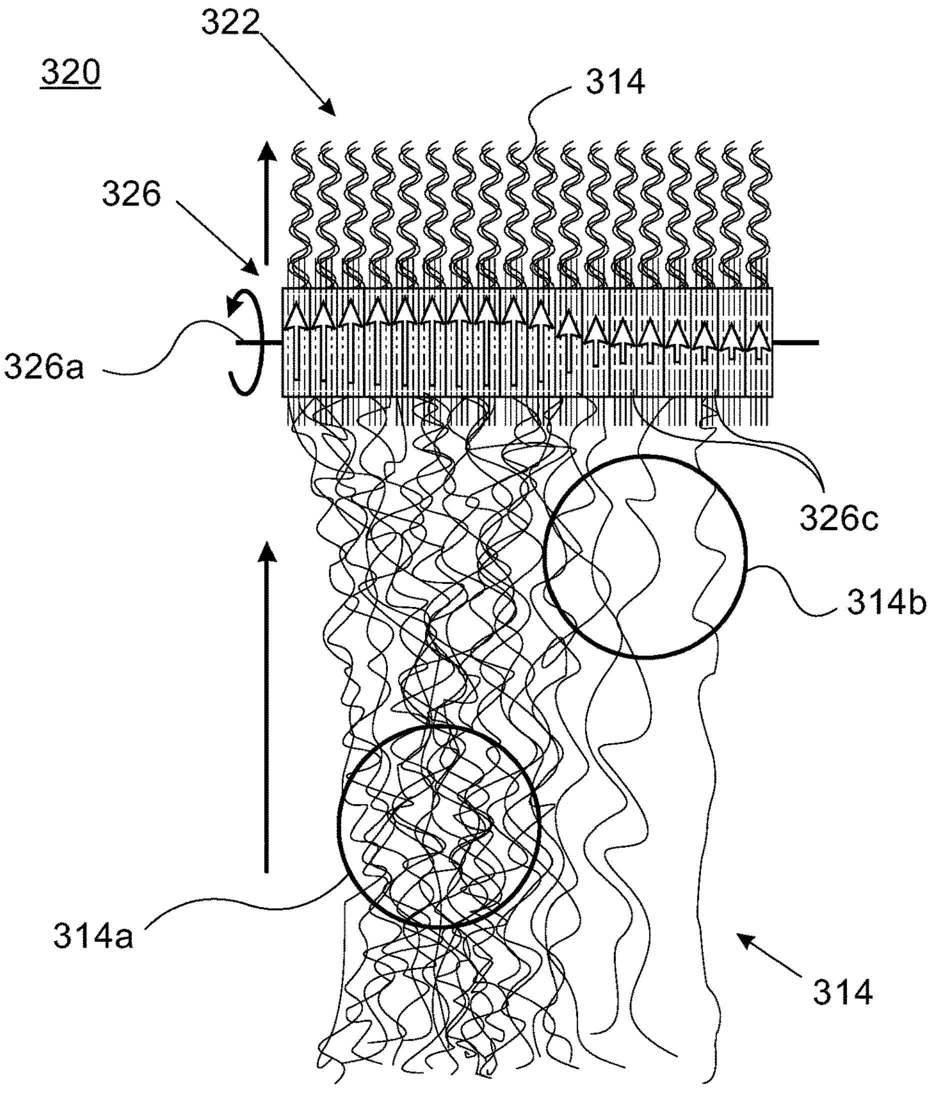

Reference is made to FIGS. 3D and 3E, which are schematic illustrations of fibers arranging module 320 of system 300, according to some embodiment some embodiments of the invention. FIG. 3D shows a schematic side view of fibers arranging module 320. FIG. 3E shows a schematic top view of fibers arranging module 320.

Figure 3F:
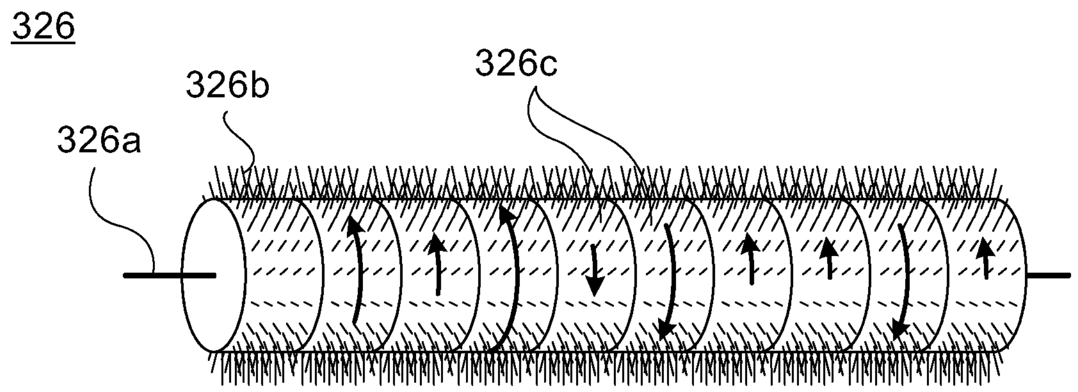
FIG. 3F is a schematic illustration of a shaft of the fibers arranging module of the system of FIG. 3A, according to some embodiment some embodiments of the invention.

Reference is also made to FIG. 3F, which is a schematic illustration of a shaft 326 of fibers arranging module 320 of system 300, according to some embodiment some embodiments of the invention.

Fibers arranging module 320 may include an elongated conduit 324 through which fibers 314 may pass (e.g., from fibers forming module 310 towards pacing module 330). Conduit 324 may include a plurality of inflow openings **324*a* through which gas, such as air, may be driven into conduit 324. Inflow openings 324*a* may be disposed along the length of conduit 324. Inflow openings 324*a* may be disposed on opposing sides of conduit 324. Gas (e.g., air) may pass in conduit 324 on opposing sides of fibers 314. The flow of gas may push fibers 314 through conduit 324. When passing through conduit 324, fibers 314 may be arranged in a layer. Fibers 314 may be randomly intertwined in the layer. Fibers 314 may be non-uniformly arranged in the layer. Fibers 314 may be non-uniformly arranged per an area unit and/or a thickness unit of the layer. For example, the layer of fibers 314 may include a first region 314*a* and a second region 314*b*, wherein the density of fibers 314 in first region 314*a* may be greater than the density of fibers in second region 314*b* (e.g., as schematically shown in FIG. 3E**).

Fibers arranging module 320 may include a shaft 326. Shaft 326 may rotate about an axis **326*a*. Shaft 326 may include a plurality of needles 326*b* projecting from a surface of shaft 326. Shaft 326 may include a plurality of rings 326*c* arranged adjacent to each other along axis 326*a* of shaft 326. Each of rings 326*c* may include a subset of needles 326*b*. Each of rings 326*c* may rotate about axis 326*a* independently from adjacent rings 326*c*. The rotation of each of rings 326*c* (e.g., the rotational speed and/or direction of rotation, as indicated by arrows in FIGS. 1D, 1E and 1F) may be controlled, for example by a controller 328. For example, if the density of fibers 314 passing through a first ring of rings 326*c* is higher than the density of fibers 314 passing through a second ring of rings 326, the first ring may be controlled to rotate at a greater rotational speed than the second ring. The density of fibers 314 passing through each of rings 236*c* may be determined based on signals from one or more sensors (e.g., light sensors or any other suitable sensors). Shaft 326 including plurality of rings 326*c* with controllable differentiated rotational speeds may uniformly (or substantially uniformly) arrange fibers 314 in layer 322. For example, shaft 326 may arrange fibers 314 evenly (or substantially evenly) per the area unit and per the thickness unit of layer 322 (e.g., as fibers 122, 222, 232 in layers 120, 220, 230, respectively, as described hereinabove). Any other suitable components may be used to arrange fibers 314 evenly (or substantially evenly) per the area unit and per the thickness unit of layer 322**.

Figure 3G:
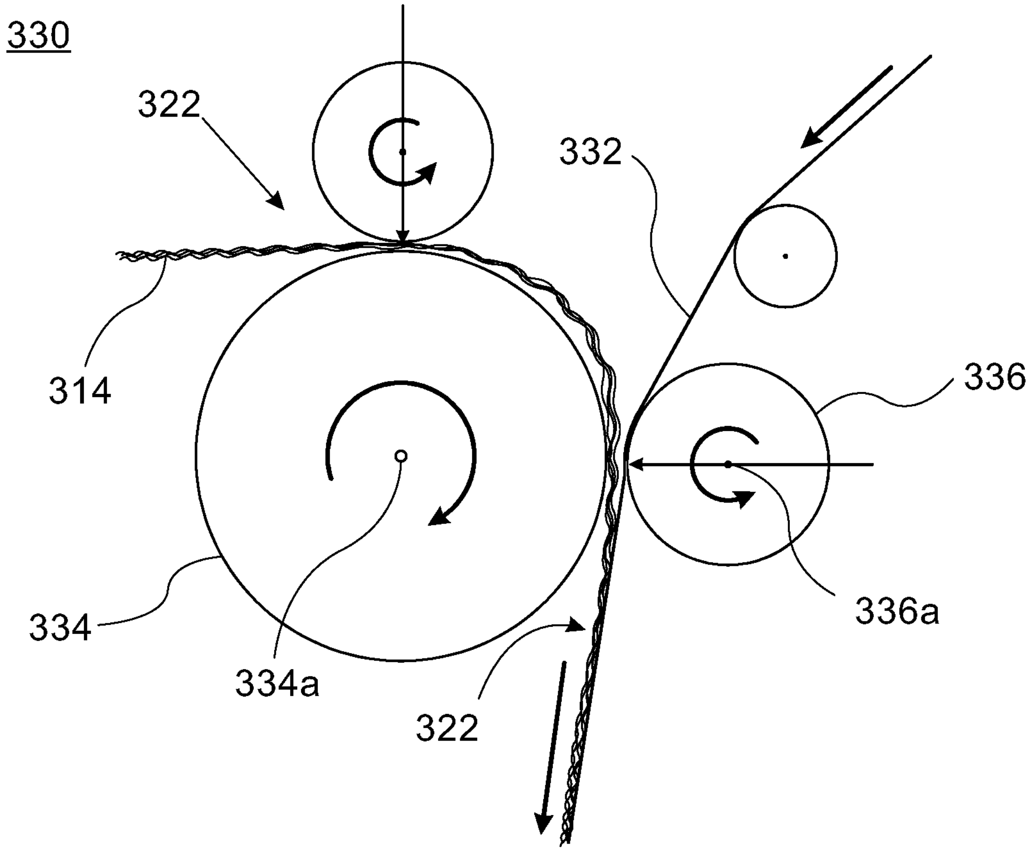
FIG. 3G is a schematic illustration of an application module of the system of FIG. 3A, according to some embodiments of the invention.

Reference is made to FIG. 3G, which is a schematic illustration of application module 330 of system 300, according to some embodiments of the invention.

Application module 330 may include a roller 334. Roller 334 may rotate about an axis **334*a*. Roller 334 may have a diameter of 1 m or more. In some embodiments, roller 334 may have diameter smaller than 1 m. Roller 334 may receive layer 322 of fibers 314 from fibers arranging module 320. Roller 334 may press layer 322 of fibers 314 against sheet material 332 (e.g., supported by a sheet material supporting roller 336 rotatable about an axis 336*a*) to place layer 332 of fibers 314 on sheet material 332. Roller 334 may be cooled. Roller 334 may be moistened. Cooling and/or moistening of roller 334 may prevent fibers 314 from adhering to roller 334. Any other suitable components may be used to place layer 332 of fibers 314 on sheet material 332**.

Figure 3H:
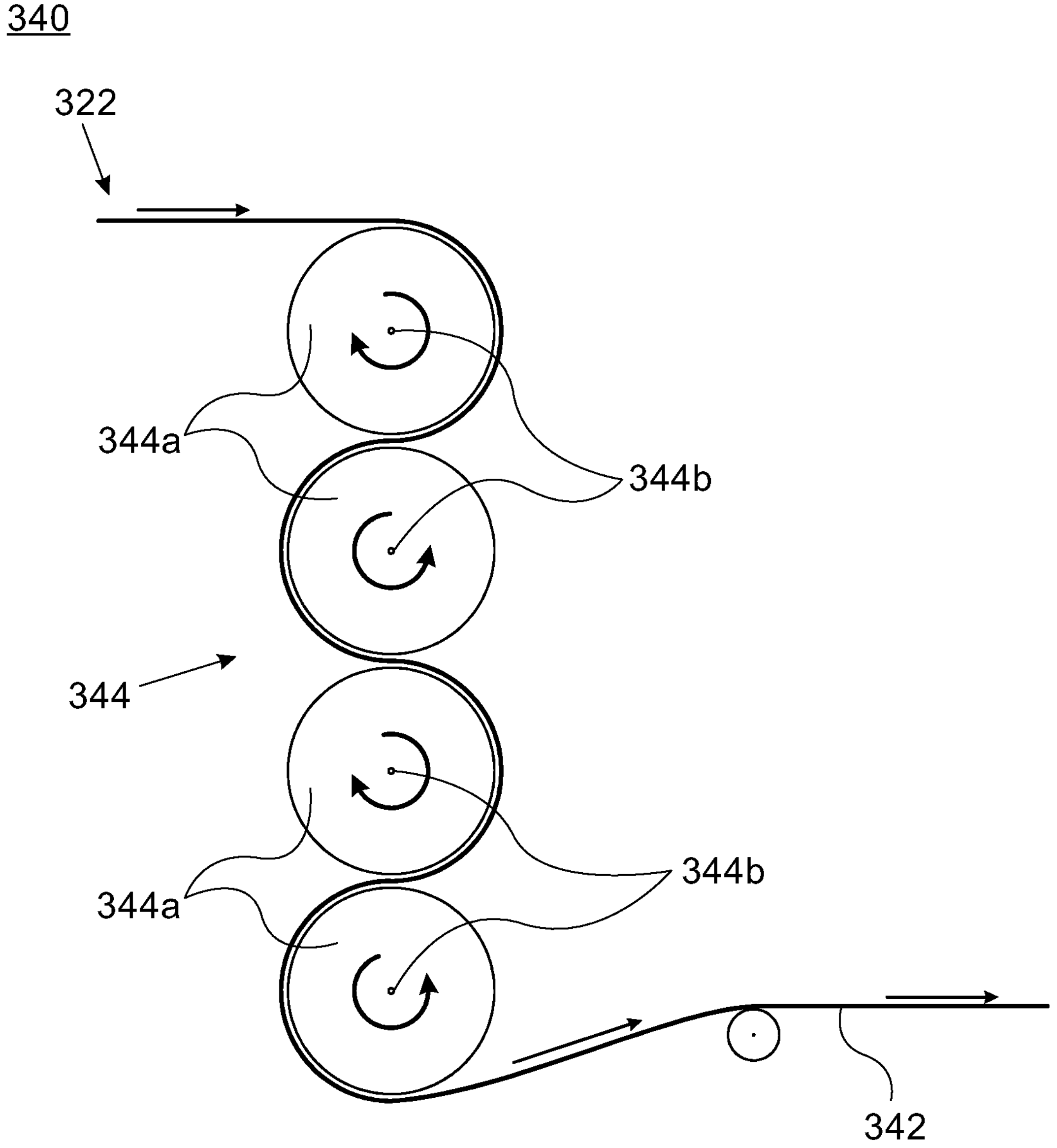
FIG. 3H is a schematic illustration of an adhering module of the system of FIG. 3A, according to some embodiments of the invention.

Reference is made to FIG. 3H, which is a schematic illustration of adhering module 340 of system 300, according to some embodiments of the invention.

Adhering module 340 may include a calendaring device 344. Calendaring device 344 may, for example, include a plurality of rollers **344*a*. Each of rollers 344*a* may rotate about its respective axis 344*b*. Layer 322 of fibers 314 disposed on sheet material 332 may pass between adjacent rollers 344*a*. Rollers 344*a* may adhere layer 322 of fibers to sheet material 332 to form sheet 342 for thermal printing (e.g., such as sheet 100 and/or sheet 200 described herein). The gap between two subsequent rollers 344*a* may be smaller than the gap between two preceding rollers 344*a*. This allows to press and level the layer 322 and/or achieve a very thin and elastic and opaque layer 322 with good physical and mechanical properties. Any other suitable calendaring devices may be used to adhere layer 322 of fibers to sheet material 332 to form sheet 342 for thermal printing. After calendaring, sheet 342** may be wound into rolls and/or cut in accordance with specified size format.

Advantageously, system 300 may provide greater speed of production of fibers 314, and allow using weaker material 311 and form thinner fibers 314 as compared to prior art method of fibers production.

Figure 4:
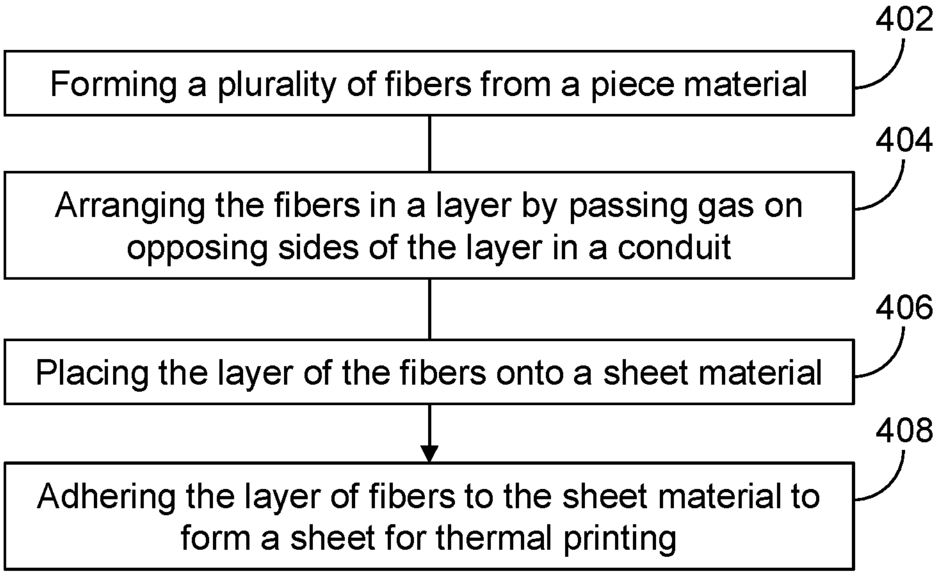
FIG. 4 is a flowchart of a method of forming a sheet for thermal printing in a gaseous medium, the sheet including a layer formed of a plurality of fibers, according to some embodiments of the invention.

Reference is made to FIG. 4, which is a flowchart of a method of forming a sheet for thermal printing in a gaseous medium, the sheet including a layer formed of a plurality of fibers, according to some embodiments of the invention.

Operations described below with respect to FIG. 4 may be performed using system 300 described hereinabove. However, any other suitable equipment may be used. By performing operations described below with respect FIG. 4, sheet 100 and/or sheet 200 for thermal printing described hereinabove may be formed.

In operation 402, a plurality of fibers (e.g., such as fibers 122, 222, 232, 314 described hereinabove) may be formed from a piece of material. The plurality of fibers may be formed by an extrusion head (e.g., such as extrusion head 312 described hereinabove). The piece of material may, for example, include polymeric material such as High Density Polyethylene (HDPE), Polyethylene terephthalate (PET), sorbitan, $SiO_2$ and/or derivatives of $SiO_2$, or any other suitable polymeric material.

In operation 404, the fibers may be arranged in a layer by passing gas on opposing sides of the layer of fibers in a conduit (e.g., conduit 324 as described hereinabove). The fibers may be randomly intertwined and evenly (or substantially evenly) arranged per a thickness unit and per an area unit of the layer (e.g., as described hereinabove). The fibers may be further arranged in the layer by a rotatable shaft having a plurality of needles projecting from a surface of the shaft (e.g., shaft 326 described hereinabove). The shaft may include a plurality of rings, wherein each of the rings may include a subset of the plurality of needles. At least one of the rings may be rotated at a different rotational speed and/or in different direction as compared to adjacent rings of the plurality of rings (e.g., as described hereinabove).

In operation 406, the layer of fibers may be placed onto a sheet material (e.g., sheet material 112, 311 described hereinabove). The layer of fibers may be placed on the sheet material by pressing the layer of fibers against the sheet material by a roller (e.g., such as roller 334 as described hereabove).

In operation 408, the layer of fibers may be adhered to the sheet material to form the sheet for thermal printing (e.g., as described hereinabove). The layer of fibers may be adhered to the sheet material by a calendaring device (e.g., such as calendaring device 344 described hereinabove).

After adhering, the sheet may be wound into rolls and/or cut in accordance with specified size format.

Figure 5A:
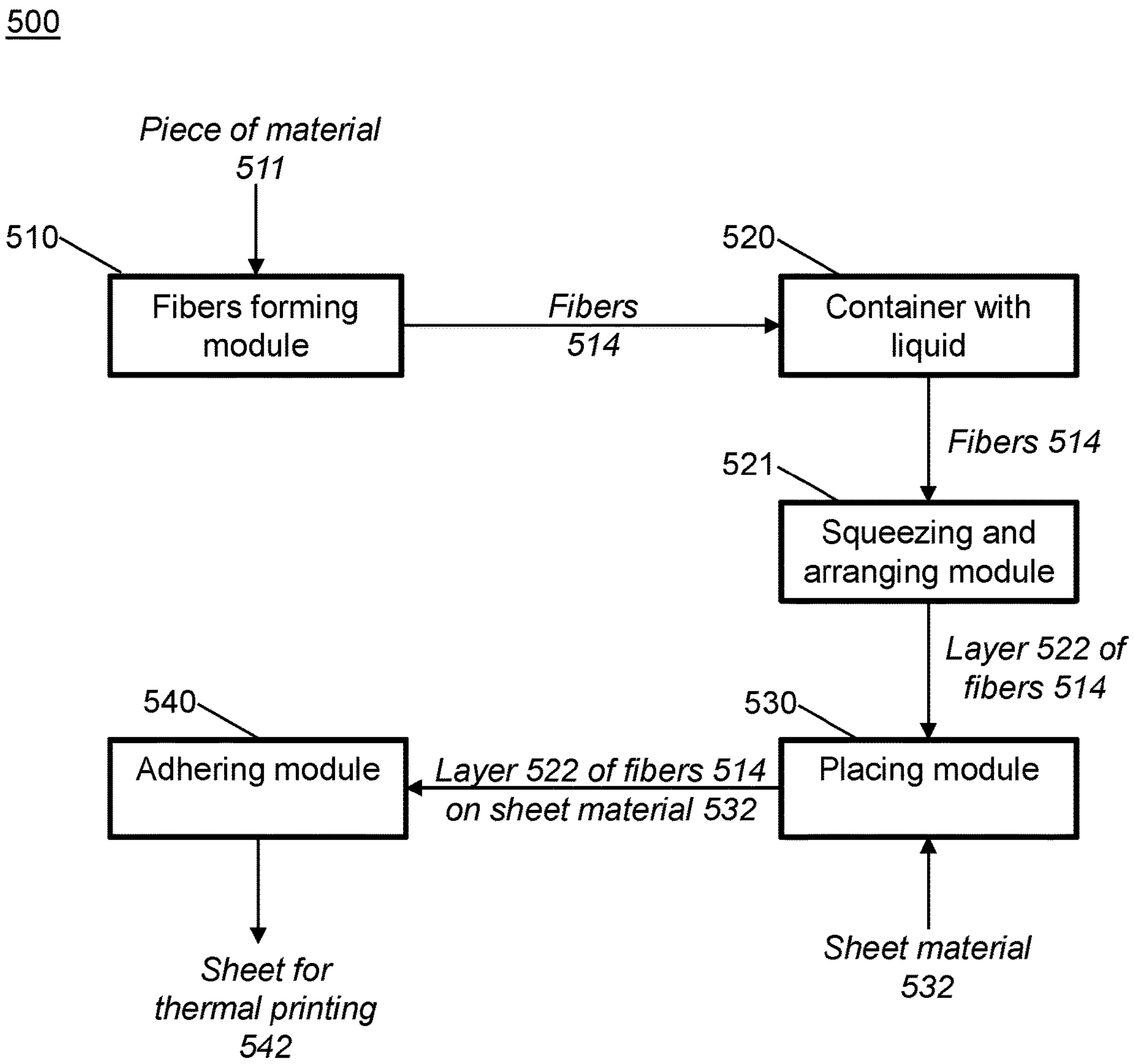
FIG. 5A is a block diagram of a system for forming a sheet for thermal printing in a liquid medium, the sheet including a layer formed of a plurality of fibers, according to some embodiments of the invention.

Reference is made to FIG. 5A, which is a block diagram of a system 500 for forming a sheet 542 for thermal printing in a liquid medium, sheet 542 may include a layer formed of a plurality fibers 514, according to some embodiments of the invention.

System 500 may be used to form sheet 100 and/or sheet 200 described hereinabove.

System 500 may include a fibers forming module 510 (e.g., such as fibers forming module 310 described hereinabove). Fibers forming module 510 may form fibers 514 from a piece of material 511. Piece of material 511 may, for example, include polymeric material such as High Density Polyethylene (HDPE), Polyethylene terephthalate (PET), sorbitan, $SiO_2$ and/or derivatives of $SiO_2$, or any other suitable polymeric material.

System 500 may include a container 520. Container 520 may include a liquid such as water or any other suitable liquid that cannot dissolve fibers 514. Fibers 514 formed in fibers forming nodule 510 may be placed in the liquid within container 520.

System 500 may include a fibers squeezing and arranging module 521. Fibers squeezing module and arranging module 521 may squeeze the liquid from fibers 514 and arrange fibers 514 in a layer 522 in which fibers 514 are randomly intertwined and evenly (or substantially evenly) arranged per a thickness unit and per an area unit of the layer (e.g., such as second layer 120, 220 and/or third layer 230 described herein). An example of fibers squeezing and arranging module 521 is described below with respect to FIG. 5B.

System 500 may include an application module 530 (e.g., such as application module 330 described hereinabove). Application module 530 may place layer 522 of fibers 514 on a sheet material 532 (e.g., such as sheet material 112 described hereinabove).

System 500 may include a fibers layer adhering module 540 (e.g., such as adhering module 340 described hereinabove). Fibers adhering module 540 may adhere layer 522 of fibers 514 to sheet material 530 to provide a sheet 542 for thermal printing (e.g., such as sheet 100 and/or 200 described herein).

After adhering (e.g., calendaring), sheet 542 may be wound into rolls and/or cut in accordance with specified size format.

Figure 5B:
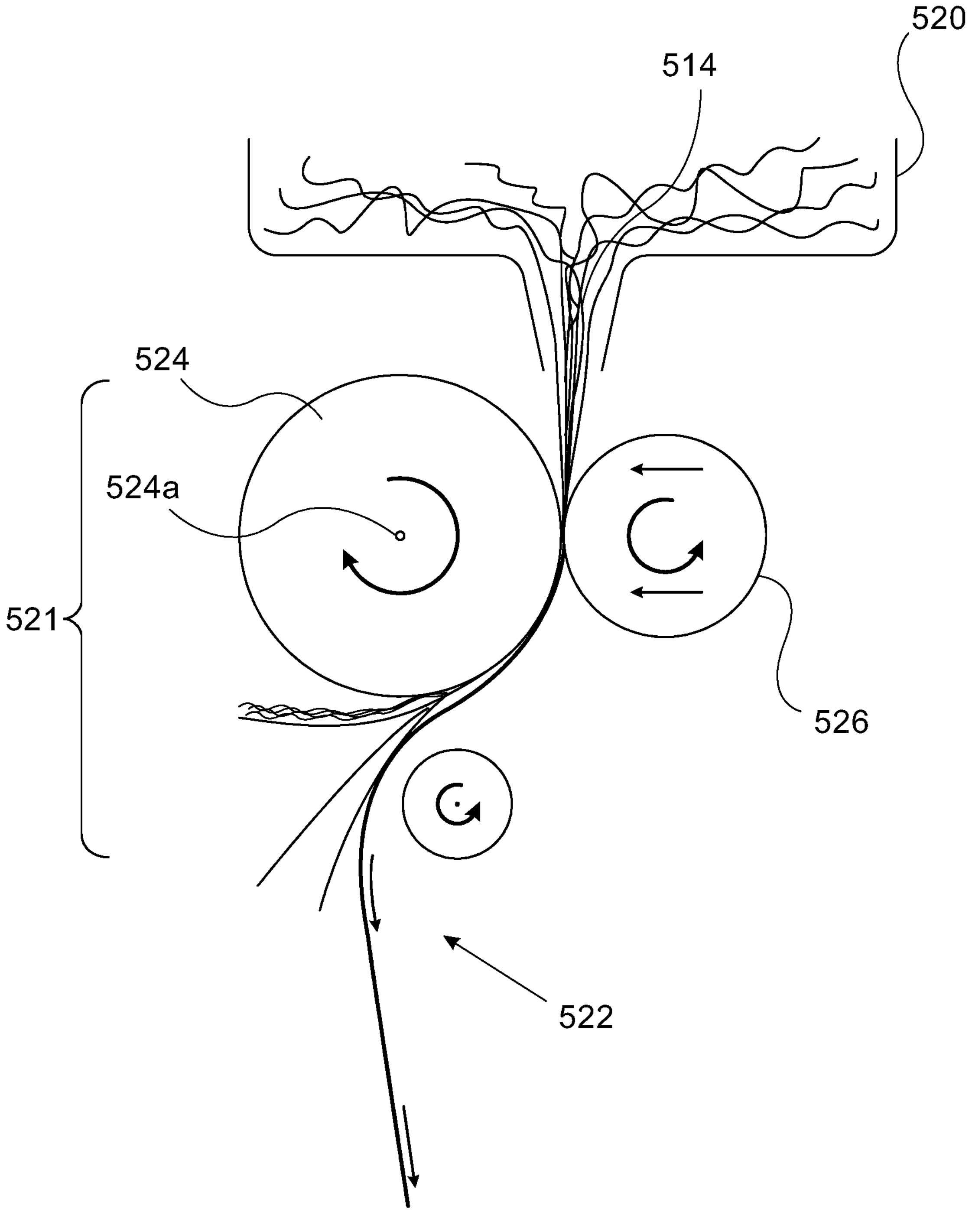
FIG. 5B is a schematic illustration of a container and a fibers squeezing and arranging module of the system of FIG. 5A, according to some embodiments of the invention.

Reference is made to FIG. 5B, which is a schematic illustration of container 521 and fibers squeezing and arranging module 521 of system 500, according to some embodiments of the invention.

Fibers squeezing and arranging module 521 may include a meshed shaft 524. Meshed roller 524 may rotate about an axis 524*a*. Meshed shaft 524 may have a diameter of 1 m or more. Meshed shaft 524 may receive layer 522 of fibers 514 from container 520. Fibers 514 may be pressed, for example by a pressing roller 526, against meshed shaft 524 to squeeze the liquid from fibers 514. The squeezing may be repeated a plurality of times, each time with new fibers 514 delivered from container 520 forming layer 522 of fibers 514 in which fibers 514 are randomly intertwined and evenly (or substantially evenly) arranged per a thickness unit and per an area unit of layer 522.

System 500 may allow forming sheets 542 with fibers 514 that have smaller thickness and lower density as compared to system 300.

Figure 6:
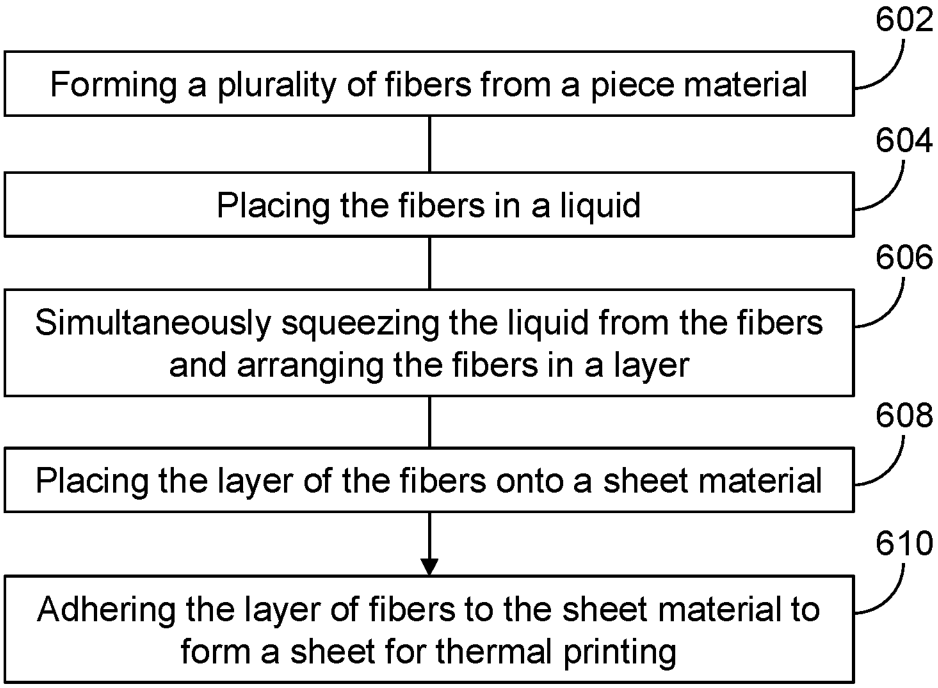
FIG. 6 is a flowchart of a method of forming a sheet for thermal printing in a liquid medium, the sheet including a layer formed of a plurality of fibers, according to some embodiments of the invention.

Reference is made to FIG. 6, which is a flowchart of a method of forming a sheet for thermal printing in a liquid medium, the sheet including a layer formed of a plurality of fibers, according to some embodiments of the invention.

Operations described below with respect to FIG. 6 may be performed using system 500 described hereinabove. However, any other suitable equipment may be used. By performing operations described below with respect FIG. 6, sheet 100 and/or sheet 200 for thermal printing described hereinabove may be formed.

In operation 602, a plurality of fibers (e.g., such as fibers 122, 222, 232, 314, 514 described hereinabove) may be formed from a piece of material. The piece of material may, for example, include polymeric material such as High Density Polyethylene (HDPE), Polyethylene terephthalate (PET), sorbitan, $SiO_2$ and/or derivatives of $SiO_2$, or any other suitable polymeric material. The plurality of fibers may be formed by an extrusion head (e.g., such as extrusion head 312 described hereinabove).

In operation 604, the fibers may be placed in a liquid (e.g., in container 520 as described hereinabove).

In operation 606, the liquid may be squeezed form the fibers and the fibers may be arranged in a layer simultaneously. The fibers may be randomly intertwined and evenly (or substantially evenly) arranged per a thickness unit and per an area unit of the layer (e.g., as described hereinabove). The liquid may be squeezed from the fibers and the fibers may be simultaneously arranged in the layer by pressing the fibers against a rotatable meshed shaft (e.g., meshed shaft 524 described hereinabove).

In operation 608, the layer of fibers may be placed onto a sheet material (e.g., sheet material 112, 311 described hereinabove). The layer of fibers may be placed on the sheet material by pressing the layer of fibers against the sheet material by a roller (e.g., such as roller 334 as described hereabove).

In operation 610, the layer of fibers may be adhered to the sheet material to form the sheet for thermal printing (e.g., as described hereinabove). The layer of fibers may be adhered to the sheet material by a calendaring device (e.g., such as calendaring device 344 described hereinabove).

After adhering, the sheet may be wound into rolls and/or cut in accordance with specified size format.

Figure 7A:
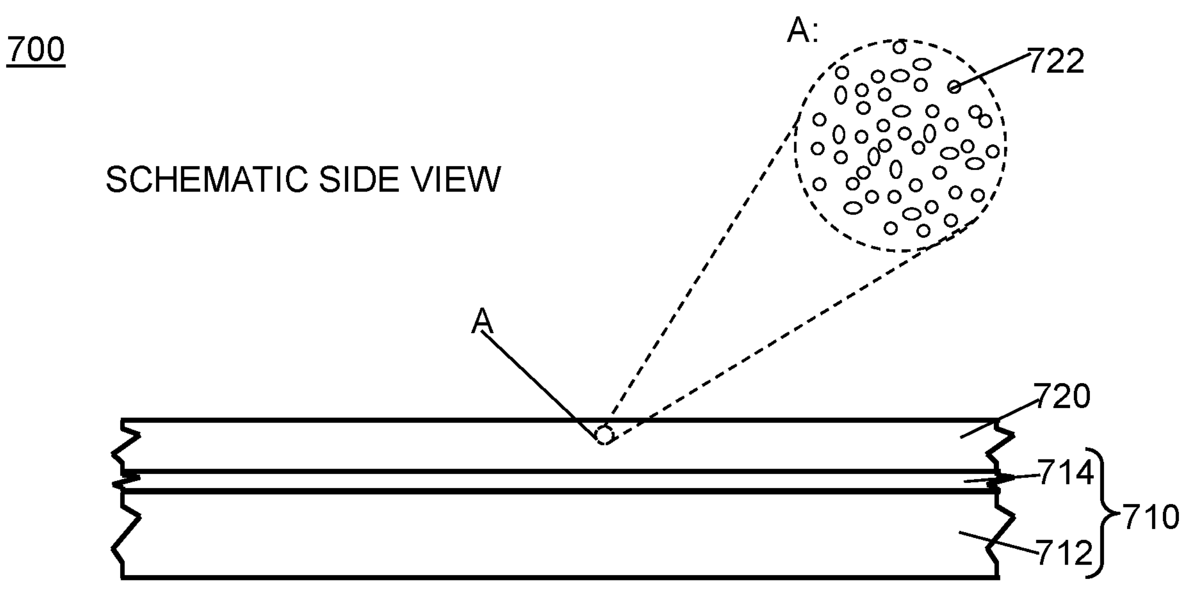
FIG. 7A is a schematic illustration of a side view of a sheet for thermal printing, the sheet including a layer formed of a plurality of particles, according to some embodiments of the invention.

Reference is made to FIG. 7A, which is a schematic illustration of a side view of a sheet 700 for thermal printing, sheet 700 including a layer 720 formed of a plurality of particles 722, according to some embodiments of the invention.

Figure 7B:
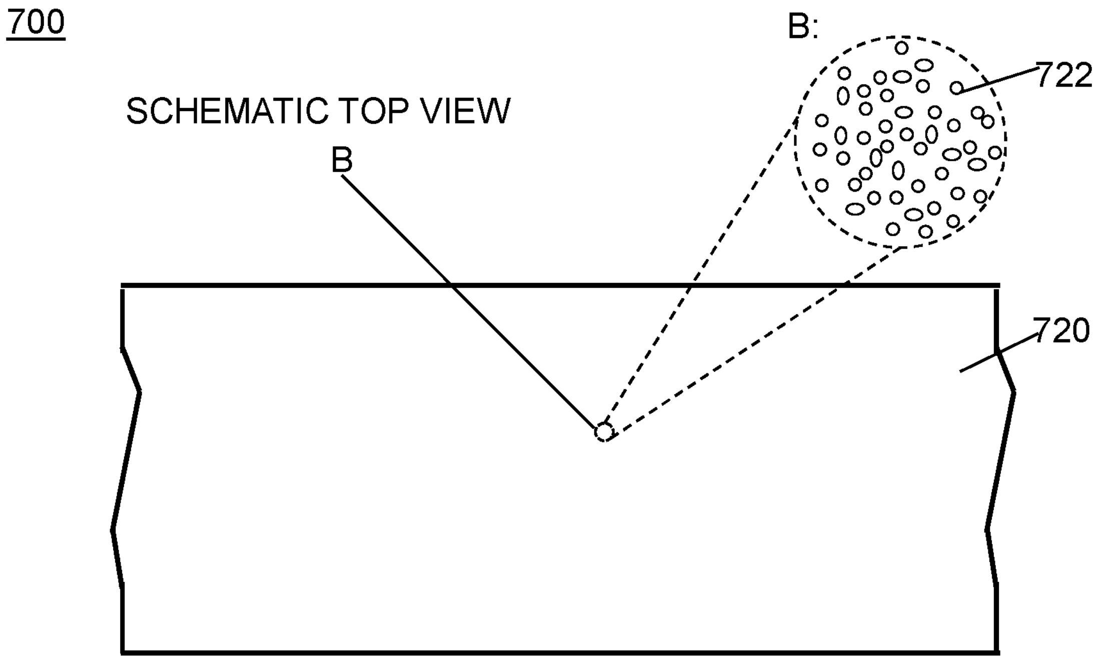
FIG. 7B is a schematic illustration of a top view of the sheet of FIG. 7A, according to some embodiments of the invention.

Reference is also made to FIG. 7B, which is a schematic illustration of a top view of sheet 700 of FIG. 7A, according to some embodiments of the invention.

Sheet 700 for thermal printing may include a first layer 710 and a second layer 720.

First layer 710 may include a sheet material 712. Sheet material 712 may include a paper, a film, a canvas or any other suitable sheet material. First layer 710 may be dyed in a specific color. For example, first layer 710 may include a dye 714 of the specific color disposed on a surface of sheet material 712 of first layer 710 (e.g., as shown in FIG. 7A). First layer 710 may be similar to first layer 110 described hereinabove.

Second layer 720 may be coextensive with first layer 710. Second layer 720 may be disposed on a surface of first layer 710. Second layer 720 may include a plurality of discrete particles 722. Particles 722 may have an aspect ratio (e.g., a ratio of length to thickness) of 1 or less. Each of particles 722 may have a circular, an oval, a polygonal and/or a flattened cross-section. Second layer 720 may have a thickness within a range of, for example, 8 to 12 μm. Particles 722 may be evenly (or substantially evenly) arranged per a thickness unit of second layer 720 (e.g., as schematically shown in FIG. 7A). For example, the number of particles 722 per thickness unit of second layer 720 may be 10,000 particles/mm. In other examples, the number of particles 722 per thickness unit of second layer 720 may be different than 10,000 particles/mm. Particles 722 may be evenly (or substantially evenly) arranged per an area unit of second layer 720 (e.g., as schematically shown in FIG. 7B). For example, the number of particles 722 per area unit of second layer 720 may be within a range of 10,000 to 12,000 particles/$mm^2$. Particles 722 may be formed of a material having a melting temperature within a range of, for example, 46° to 48° C. Particles 722 may be formed of a material having a dropping point temperature within a range of, for example, 54° to 56° C. Particles 722 may be formed of a material that has a coefficient of refraction of light that is different from the coefficient of refraction of light of air. For example, particles 722 may be formed of polymeric material such as High Density Polyethylene (HDPE), Polyethylene terephthalate (PET), sorbitan, $SiO_2$ and/or derivatives of $SiO_2$, or any other suitable polymeric material. Particles 722 of second layer 720 may be at least partly transmissive to light in the visible light range.

Figure 7C:
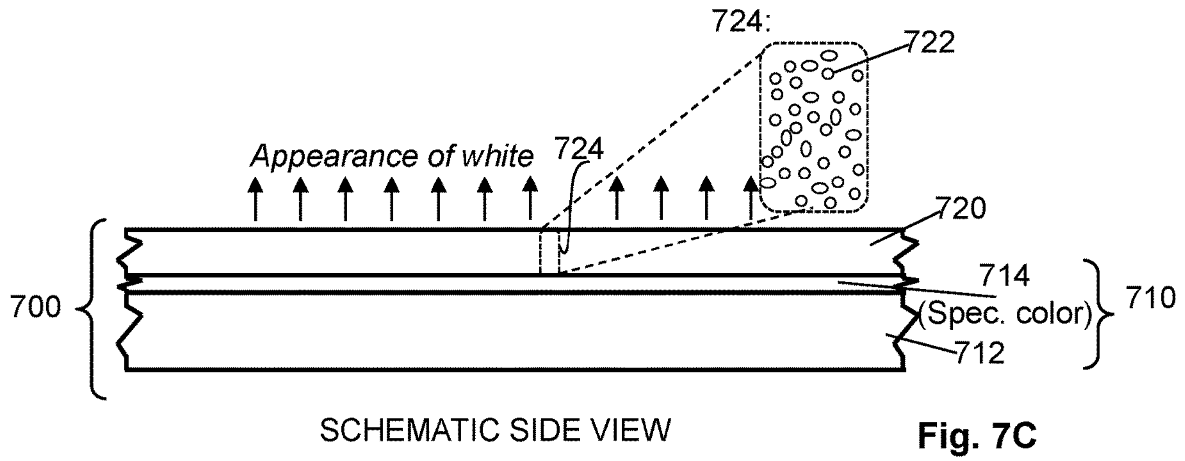
FIGS. 7C, 7D and 7E are schematic illustrations of the sheet of FIGS. 7A-7B in a thermal printing operation, according to some embodiments of the invention.
Figure 7D:
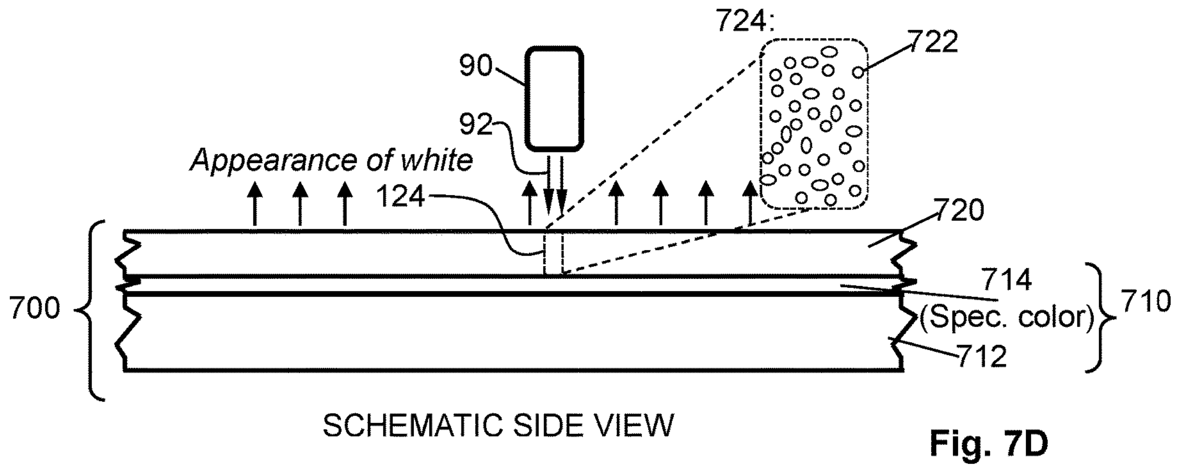
Figure 7E:
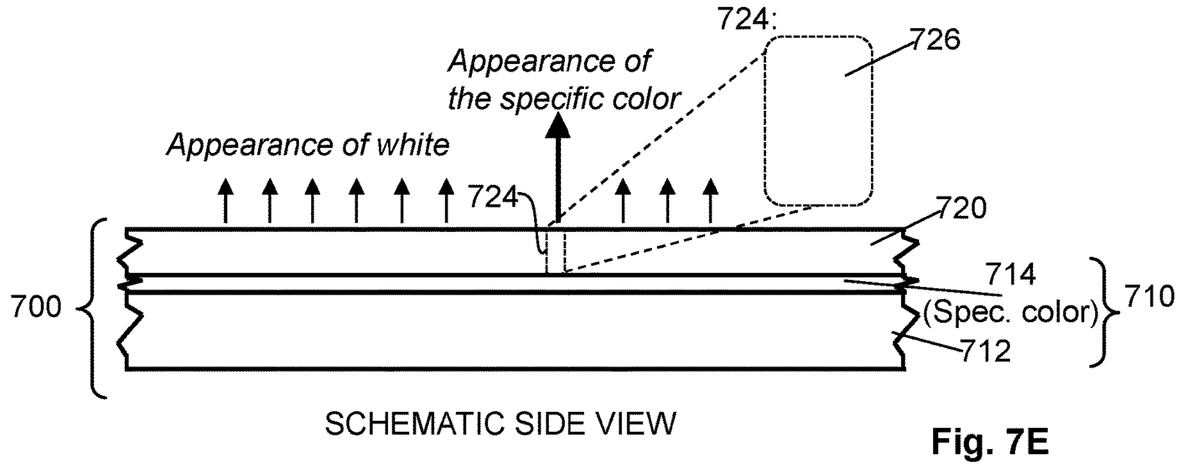

Reference is made to FIGS. 7C, 7D and 7E, which are schematic illustrations of sheet 700 of FIGS. 7A-7B in a thermal printing operation, according to some embodiments of the invention. FIGS. 7C, 7D and 7E show a schematic side view of sheet 700.

When light in the visible light range is passing through second layer 720 of sheet 700, particles 722 of second layer 720 may cause all (or substantially all) wavelengths of the light to evenly (or substantially evenly) reflect and/or refract a plurality of times. For example, for second layer 720 for second layer 120 having the thickness ranging within 8 to 10 μm, the number of particles per the thickness unit of second layer 120 of 10,000 particles/mm and/or the number of particles per the area unit of second layer of 10,000-12,000 particles/$mm^2$, the light passing through second layer 720 may reflect and/or refract between 10,000 to 12,000 times. The even (or substantially even) reflection and/or refraction of all (or substantially all) wavelengths of the light passing through second layer 722 the plurality of times may cause second layer 722 to appear white (or substantially white), for example as schematically indicated in FIGS. 7C, 7D and 7E.

When a thermal printer 90 sends a pulse of heat 92 onto a selected region 724 of second layer 720 of sheet 700 and heats selected region 724 to the melting temperature of the material from which particles 722 are formed (e.g., as schematically indicated in FIG. 7D), particles 722 in selected heated region 722 may fuse into one continuous portion 726 (e.g., as schematically indicated in FIG. 7E). Continuous portion 726 may be at least partly transmissive to light in the visible light range. Light passing through continuous portion 726 of selected heated region 722 of second layer 720 may reflect and/or refract twice-when entering second layer 720 and when exiting second layer 720. First layer 710 dyed in the specific color may absorb all (or substantially all) wavelengths of the light except the wavelength of the specific color. First layer 710 may reflect the wavelength of the specific color. Accordingly, selected heated region 722 of second layer 720 of sheet 720 may appear in the specific color (or substantially in the specific color) on sheet 700, for example as schematically indicated in FIG. 7E.

Figure 8:
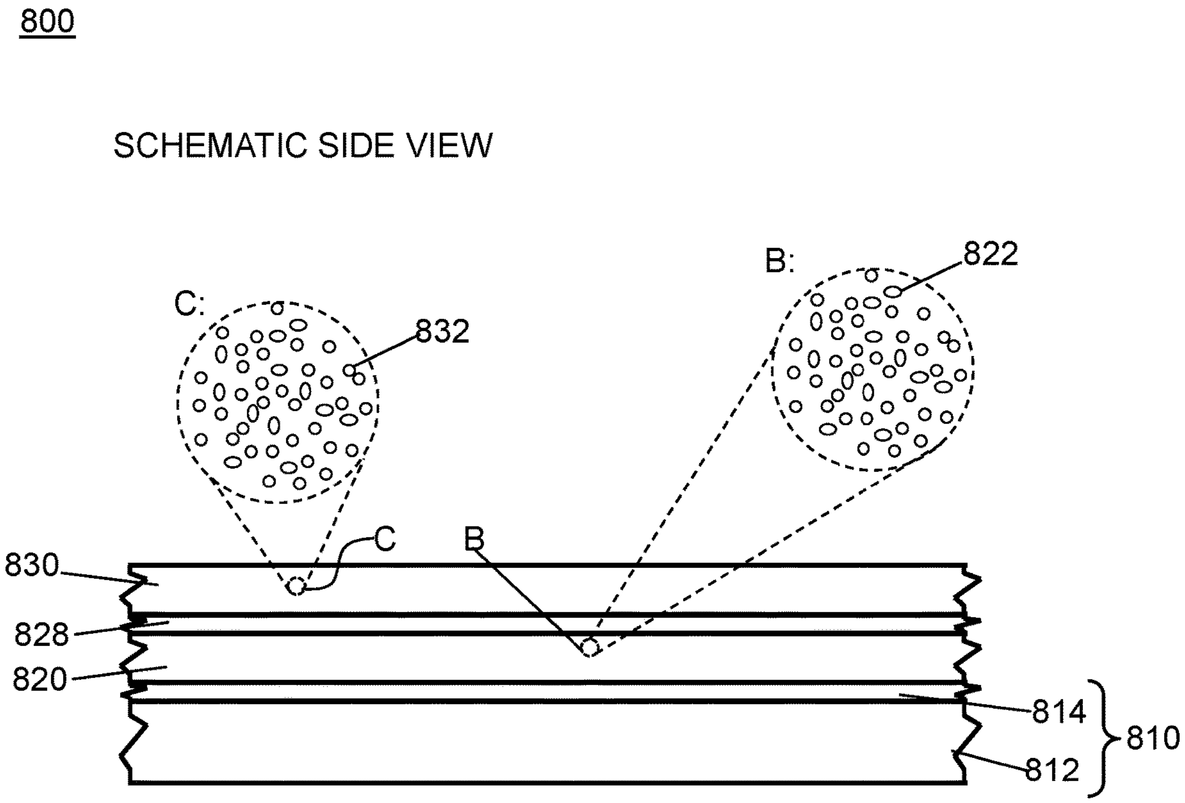
FIG. 8 is a schematic illustration of a side view of a sheet for thermal printing, the sheet including two layers formed of a plurality of particles, according to some embodiments of the invention.

Reference is made to FIG. 8, which is a schematic illustration of a side view of sheet 800 for thermal printing, sheet 800 including two layers 820, 830 formed of a plurality of particles, according to some embodiments of the invention.

Sheet 800 for thermal printing may include a first layer 810, a second layer 820 and a third layer 830. First layer 810 and second layer 820 may be dyed in different colors (e.g., as described hereinbelow) thus allowing colored thermal printing.

First layer 810 may include a sheet material 812. Sheet material 812 that may include a paper, a film, a canvas or any other suitable sheet material. First layer 810 may be dyed in a first specific color. For example, first layer 810 may include a dye 814 of the first specific color disposed on a surface of sheet material 812 of first layer 810. First layer 810 may be similar to first layer 110 described hereinabove.

Second layer 820 may be coextensive with first layer 810. Second layer 820 may be disposed on a surface of first layer 810. Second layer 820 may include a plurality of particles 822 (e.g., as described hereinabove with respect to particles 722). Second layer 820 may be dyed in a second specific color. For example, a dye 828 of the second specific color may be disposed on a surface of second layer 820. The second specific color of second layer 820 may be different from the first specific color of first layer 810.

Third layer 830 may be coextensive with second layer 820. Third layer 830 may be disposed on a surface of second layer 820. Third layer 830 may include a plurality of particles 832 (e.g., as described hereinabove with respect to particles 722). Particles 832 of third layer 830 may be formed of a material having the melting temperature that is different from the melting temperature of the material from which particles 822 of second layer 820 are formed.

Particles 832 of third layer 830 may melt before particles 822 of second layer when a pulse of heat is sent onto sheet 800. The number of particles 822 in second layer 820 and particles 832 in third layer 830 and/or the density of particles 822 in second layer 820 and particles 832 in third layer 830 and/or the spatial arrangement of particles 822 in second layer 820 and particles 832 in third layer 830 and/or any other suitable parameter of sheet 800 may be set to cause particles 832 of third layer 830 to melt before particles 822 of second layer when a pulse of heat is applied to sheet 800.

In operation, a thermal printer may send a pulse of heat onto a selected region of sheet 800 to heat third layer 830 in the selected region and cause the selected region to appear substantially in the second specific color (e.g., as described above with respect to FIGS. 7C, 7D and 7E). If desired, the power of the heat pulse may be increased to heat second layer 820 in the selected region and cause the selected region to appear substantially in the first specific color and/or in a combination of the first specific color and the second specific color (e.g., as described above with respect to FIGS. 7C, 7D and 7E).

While two layers 820, 830 with particles 822, 832, respectively, are shown, sheet 800 may include any suitable number of layers with particles (e.g., three or more layers) wherein each of the layers may be dyed in a different color as compared to the other layers.

Figure 9A:
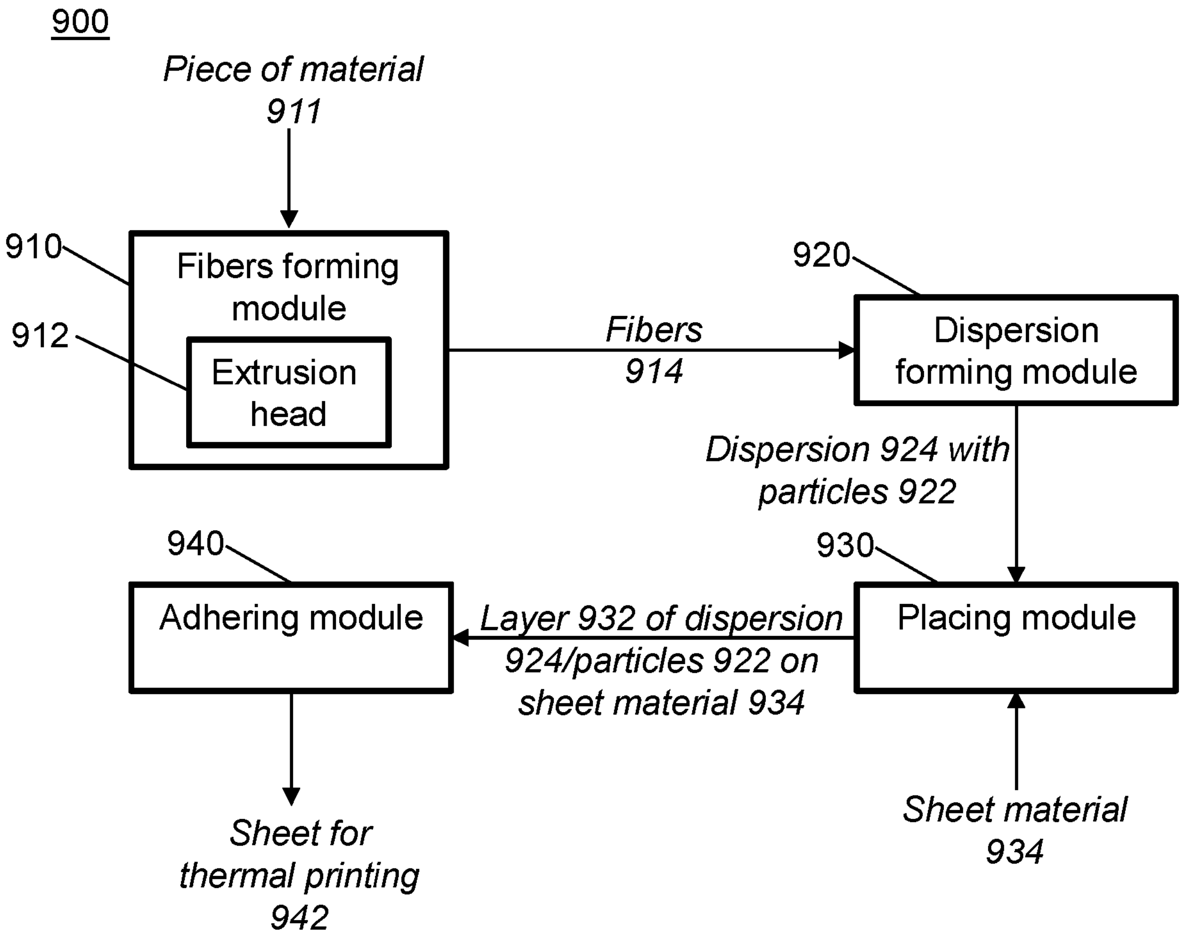
FIG. 9A is a block diagram of a system for forming a sheet for thermal printing, the sheet including a layer formed of a plurality of particles, according to some embodiments of the invention.

Reference is made to FIG. 9A, which is a block diagram of a system 900 for forming a sheet 942 for thermal printing, sheet 942 including a layer 932 formed of a plurality of particles 922, according to some embodiments of the invention.

System 900 may be used to form sheet 700 and/or sheet 800 described hereinabove.

System 900 may include a fibers forming module 910. Fibers forming module 910 may receive a piece of material 911. Fibers forming module 910 may operate an extrusion head 912 (e.g., such as extrusion head 312 described above with respect to FIGS. 3B-3C). Extrusion head 912 may form a plurality of fibers 914 (e.g., such as fibers 722, 822, 823 described herein) from piece of material 911. Piece of material 911 may, for example, include polymeric material such as High Density Polyethylene (HDPE), Polyethylene terephthalate (PET), sorbitan, $SiO_2$ and/or derivatives of $SiO_2$, or any other suitable polymeric material.

System 900 may include a dispersion forming module 920. Dispersion forming module 920 may receive fibers 914 and brake fibers 914 into shorter lengths to form a plurality of particles 922 (e.g., such as particles 722, 822, 832 described hereinabove). Dispersion forming module 920 may include refining means (e.g., such as a bead mill, a high shear mixer, or any other suitable mixing or grinding device) to refine and/or uniform the size of particles 922. Dispersion forming module 920 may prepare a dispersion 924 of particles 922 and water (with or without binder), solvent (which does not dissolve material 911) or any other suitable liquid. Dispersion 924 may have different dry residue, depending on for example, placing or application method. In the example of placing or application module 930 of FIG. 9B, the dry residue of dispersion 924 may be 30%.

System 900 may include an application module 930. Application module 930 may apply (e.g., place) layer 932 of dispersion 924 of particles 922 on a sheet material 934 (e.g., such as sheet material 712 described hereinabove). Dispersion 924 of particles 922 may be placed or applied on using suitable type of printing equipment, coating and/or on any equipment configured to form a layer on the surface of any suitable material. An example of application module 930 is described below with respect to FIGS. 9B.

System 900 may include an adhering module 940. Adhering module 940 may adhere layer 932 to sheet material 934 to provide a sheet 942 for thermal printing (e.g., such as sheet 700 and/or 800 described herein). Adhering module 940 may include a calendaring device such as calendaring device described above with respect to FIG. 3H or any other suitable calendaring device.

After adhering (e.g., calendaring), sheet 942 may be wound into rolls and/or cut in accordance with specified size format.

Figure 9B:
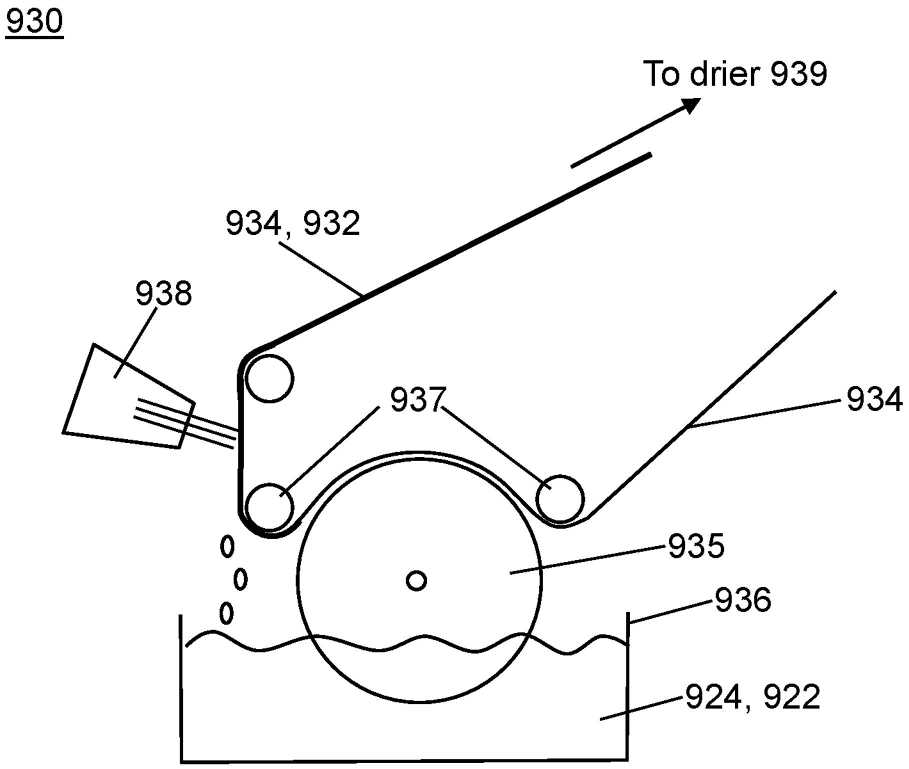
FIG. 9B is a schematic illustration of an application module of the system of FIG. 9A, according to some embodiments of the invention.

Reference is made to FIG. 9B, which is a schematic illustration of application module 930 of system 900 of FIG. 9A, according to some embodiments of the invention.

Application module 930 may include a shaft 935. Shaft 935 may have, for example, a smooth (e.g., polished) surface. In another example, shaft 935 may have an engraved (e.g., anilox) surface. The engraving measure and/or the engraving pattern may depend on, for example, the desired amount of application of dispersion 924/particles 922 and/or the direction and/or speed of rotation of shaft 935. Shaft 935 may be partly placed within a container 936 containing dispersion 924 of particles 922. Sheet material 934 may be passed along shaft 935 using a plurality of shafts 937. The contact area between sheet material 934 and shaft 935 may be within the range of, for example, 10% to 50% of the area of shaft 936. Excess dispersion 924 may be removed from (e.g., blown off) sheet material 934 using, for example, an air knife 938 or any other suitable means. This may allow to form uniform layer 932 even if shaft 935 is operated at relatively high rotational speed. After application, sheet material 934 with layer 932 of dispersion 924 with particles 922 may be dried using a drier 939. Drier 939 may include flotation or any other suitable drying means. After drying (e.g., when the moisture parameters approach or reach the natural (e.g., original) moisture content of the sheet material 934), sheet material 934 with layer 932 may be forwarded to adhering module 940.

Figure 10:
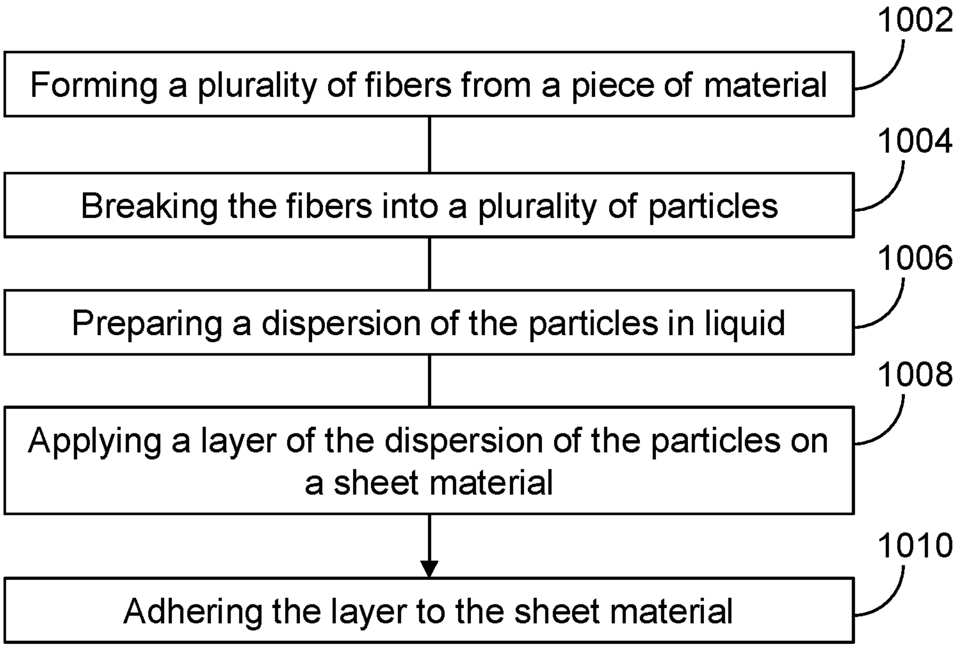
FIG. 10 is a flowchart of a method of forming a sheet for thermal printing, the sheet including a layer formed of a plurality of particles, according to some embodiments of the invention.

Reference is made to FIG. 10, which is a flowchart of a method of forming a sheet for thermal printing, the sheet including a layer formed of a plurality of particles, according to some embodiments of the invention.

Operations described below with respect to FIG. 10 may be performed using system 900 described hereinabove. However, any other suitable equipment may be used. By performing operations described below with respect FIG. 10, sheet 700 and/or sheet 800 for thermal printing described hereinabove may be formed.

In operation 1002, a plurality of fibers (e.g., such as fibers 916 described hereinabove) may be formed from a piece of material. The plurality of fibers may be formed by an extrusion head (e.g., such as extrusion head 312 described hereinabove).

In operation 1004, the fibers may be broken into shorter lengths to form a plurality of particles (e.g., such as particles 722, 822, 832, 922; using dispersion forming module 920 as described hereinabove). The size of particles may be refined and/or uniformed using a bead mill, a high shear mixer, or any other suitable mixing or grinding device (e.g., as described hereinabove).

In operation 1006, a dispersion (such as dispersion 924 described hereinabove) of the particles in water (with or without binder), solvent (which does not dissolve material 911) or any other suitable liquid may be prepared (e.g., using dispersion forming module 920 as described hereinabove).

In operation 1008, the dispersion of the particles may be applied to a sheet material to form a layer of the dispersion of the particles on the sheet material (e.g., using application module 930 as described hereinabove). The dispersion may be applied to the sheet material using, for example, a shaft (e.g., such as shaft 935 described hereinabove). Excess dispersion may be removed from (e.g., blown off) sheet material using, for example, an air knife (e.g., such as air knife 938) or any other suitable means (e.g., as described hereinabove).

The sheet material with the applied layer of the dispersion of the particles may be dried (e.g., using a drier 939 as described hereinabove).

In operation 1010, the layer may be adhered to the sheet material (e.g., using adhering module 940 including, for example, a calendaring device as described hereinabove) to provide the sheet for thermal printing (e.g., such as sheet 700, 800, 942 described hereinabove).

After adhering, the sheet may be wound into rolls and/or cut in accordance with specified size format.

Figure 11A:
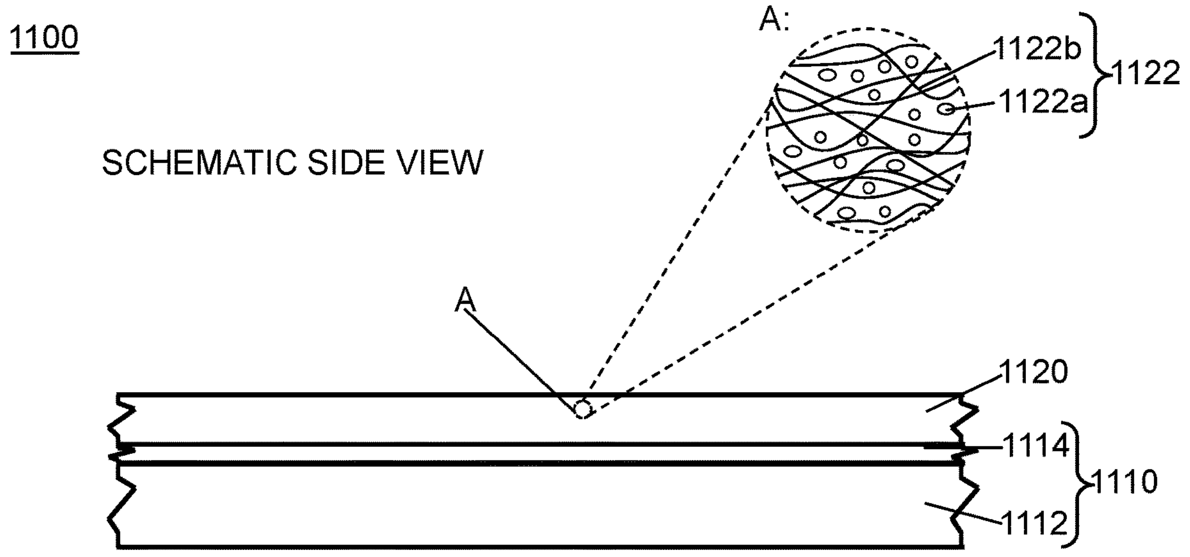
FIG. 11A is a schematic illustration of a side view of a sheet for thermal printing, the sheet including a layer formed of a plurality of discrete particles including non-fiber particles and fibers, according to some embodiments of the invention.

Reference is made to FIG. 11A, which is a schematic illustration of a side view of a sheet 1100 for thermal printing, sheet 1100 including a layer 1120 formed of a plurality of discrete particles 1122 including non-fiber particles 1122*a* and fibers 1122*b*, according to some embodiments of the invention.

Figure 11B:
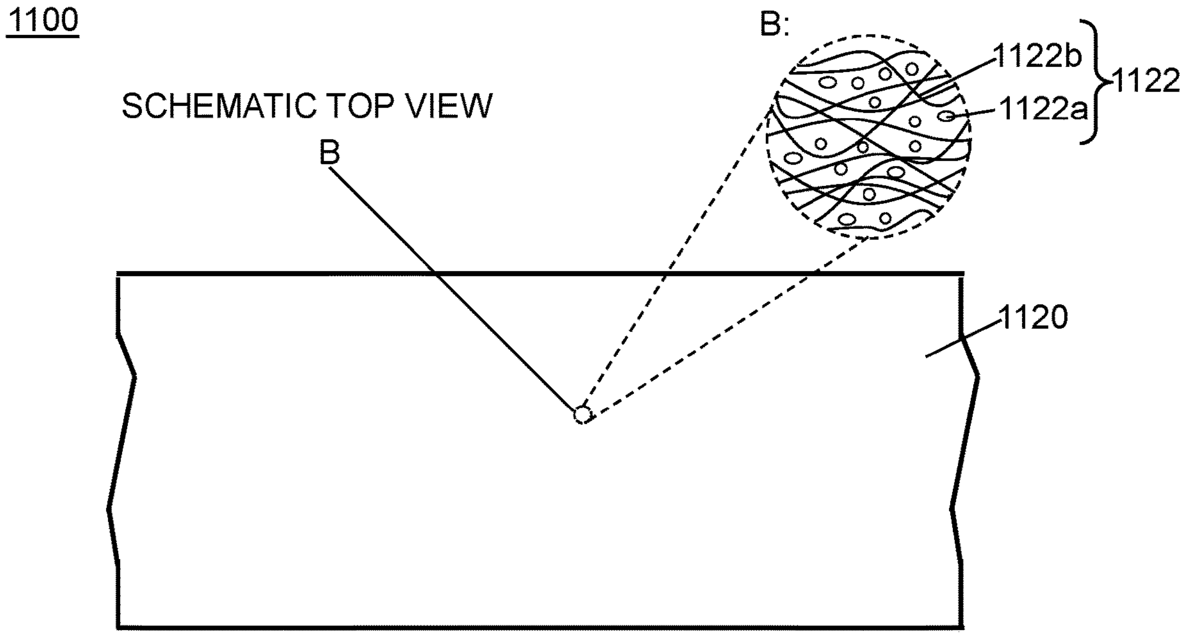
FIG. 11B is a schematic illustration of a top view of the sheet of FIG. 11A, according to some embodiments of the invention.

Reference is also made to FIG. 11B, which is a schematic illustration of a top view of sheet 1100 of FIG. 11A, according to some embodiments of the invention.

Sheet 1100 for thermal printing may include a first layer 1110 and a second layer 1120.

First layer 1110 may include a sheet material 1112. Sheet material 1112 may include a paper, a film, a canvas or any other suitable sheet material. First layer 1110 may be dyed in a specific color. For example, first layer 1110 may include a dye 1114 of the specific color disposed on a surface of sheet material 1112 of first layer 1110 (e.g., as shown in FIG. 11A). First layer 1110 may be similar to first layer 710 described hereinabove.

Second layer 1120 may be coextensive with first layer 1110. Second layer 1120 may be disposed on a surface of first layer 1110. Second layer 1120 may include a plurality of discrete particles 1122. Particles 1122 may include a plurality non-fiber particles 1122*a* (e.g., such as particles 722 described hereinabove) and a plurality of fibers 1122*b* (e.g., such as fibers 122 described hereinabove). For example, fibers 1122*b* may be 10 to 95% of particles 1122.

Second layer 1120 may have a thickness within a range of, for example, 8 to 12 μm. Particles 1122 may be evenly (or substantially evenly) arranged per a thickness unit of second layer 1120 (e.g., as schematically shown in FIG. 11A). For example, the number of particles 1122 per thickness unit of second layer 1120 may be 10,000 particles/mm. In other examples, the number of particles 1122 per thickness unit of second layer 1120 may be different than 10,000 particles/mm. Particles 1122 may be evenly (or substantially evenly) arranged per an area unit of second layer 1120 (e.g., as schematically shown in FIG. 11B). For example, the number of particles 1122 per area unit of second layer 1120 may be within a range of 10,000 to 12,000 particles/mm$^2$. Non-fiber particles 1122*a* may be arranged between fibers 1122*b*. Non-fiber particles 1122*a* may be evenly (or substantially evenly) arranged between fibers 1122*b* per the thickness unit of second layer 1120. Non-fiber particles 1122*a* may be evenly (or substantially evenly) arranged between fibers 1122*b* per the area unit of second layer 1120. Each of particles 1122 may have a circular, an oval, a polygonal and/or a flattened cross-section (e.g., as described hereinabove).

Particles 1122 may be formed of a material having a melting temperature within a range of, for example, 46° to 48° C. Particles 1122 may be formed of a material having a dropping point temperature within a range of, for example, 54° to 56° C. Particles 1122 may be formed of a material that has a coefficient of refraction of light that is different from the coefficient of refraction of light of air. For example, particles 1122 may be formed of polymeric material such as High Density Polyethylene (HDPE), Polyethylene terephthalate (PET), sorbitan, $SiO_2$ and/or derivatives of $SiO_2$, or any other suitable polymeric material. Particles 1122 of second layer 1120 may be at least partly transmissive to light in the visible light range.

Figure 11C:
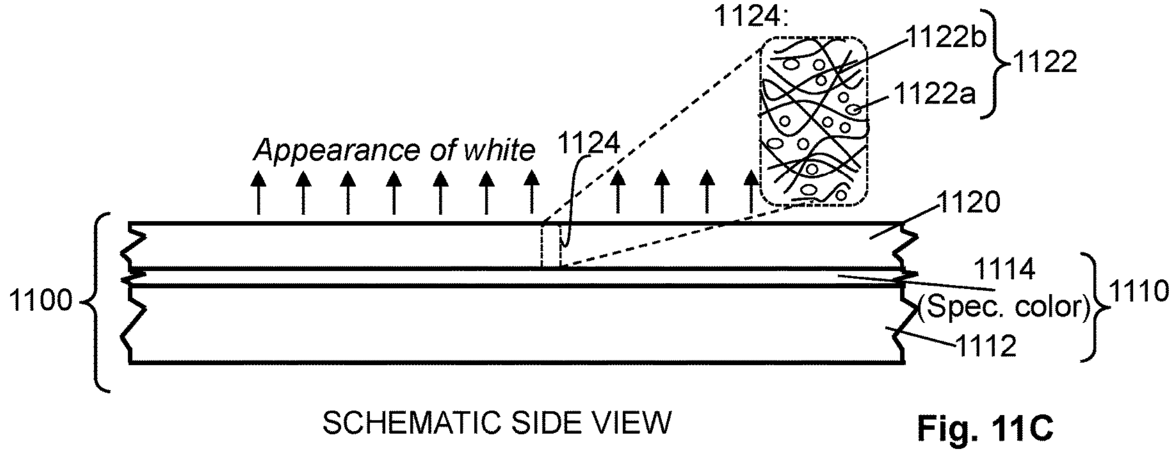
FIGS. 11C, 11D and 11E are schematic illustrations of the sheet of FIGS. 11A-11B in a thermal printing operation, according to some embodiments of the invention.
Figure 11D:
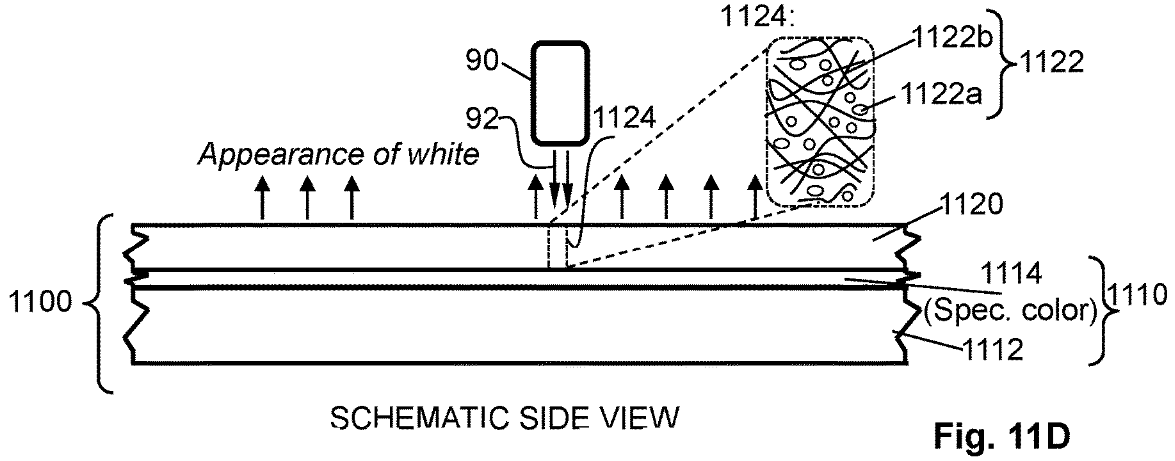
Figure 11E:
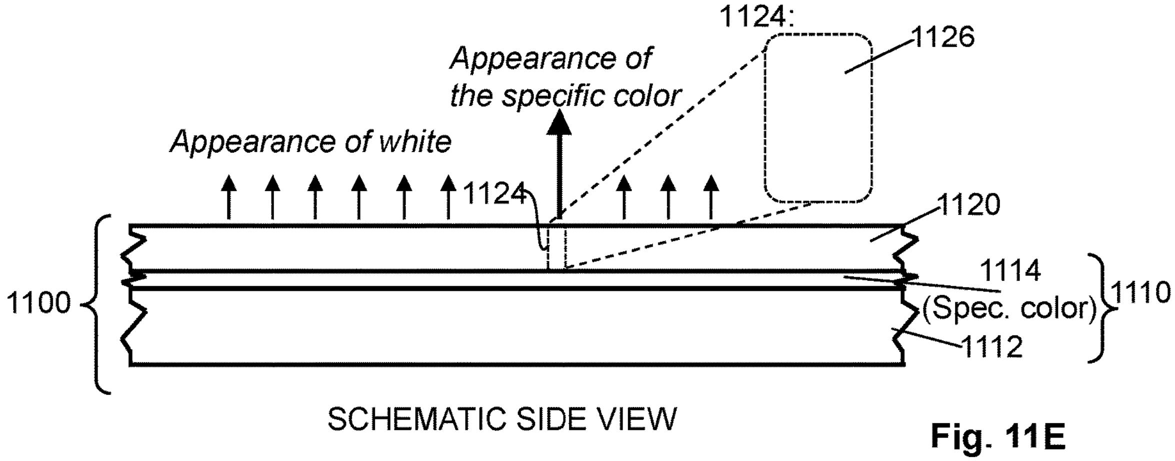

Reference is made to FIGS. 11C, 11D and 11E, which are schematic illustrations of sheet 1100 of FIGS. 11A-11B in a thermal printing operation, according to some embodiments of the invention. FIGS. 11C, 11D and 11E show a schematic side view of sheet 1100.

When light in the visible light range is passing through second layer 1120 of sheet 1100, particles 1122 (e.g., non-fiber particles 1122*a* and fibers 1122*b*) of second layer 1120 may cause all (or substantially all) wavelengths of the light to evenly (or substantially evenly) reflect and/or refract a plurality of times. For example, for second layer 1120 having the thickness ranging within 8 to 10 μm, the number of particles per the thickness unit of second layer 1120 of 10,000 particles/mm and/or the number of particles per the area unit of second layer of 10,000-12,000 particles/mm$^2$, the light passing through second layer 1120 may reflect and/or refract between 10,000 to 12,000 times. The even (or substantially even) reflection and/or refraction of all (or substantially all) wavelengths of the light passing through second layer 1122 the plurality of times may cause second layer 1122 to appear white (or substantially white), for example as schematically indicated in FIGS. 11C, 11D and 11E.

When a thermal printer 90 sends a pulse of heat 92 onto a selected region 1124 of second layer 1120 of sheet 1100 and heats selected region 1124 to the melting temperature of the material from which particles 1122 are formed (e.g., as schematically indicated in FIG. 11D), particles 1122 (e.g., non-fiber particles 1122*a* and fibers 1122*b*) in selected heated region 1122 may fuse into one continuous portion 1126 (e.g., as schematically indicated in FIG. 11E). Continuous portion 1126 may be at least partly transmissive to light in the visible light range. Light passing through continuous portion 1126 of selected heated region 1122 of second layer 1120 may reflect and/or refract twice-when entering second layer 1120 and when exiting second layer 1120. First layer 1110 dyed in the specific color may absorb all (or substantially all) wavelengths of the light except the wavelength of the specific color. First layer 1110 may reflect the wavelength of the specific color. Accordingly, selected heated region 1122 of second layer 1120 of sheet 1120 may appear in the specific color (or substantially in the specific color) on sheet 1100, for example as schematically indicated in FIG. 11E.

Figure 12:
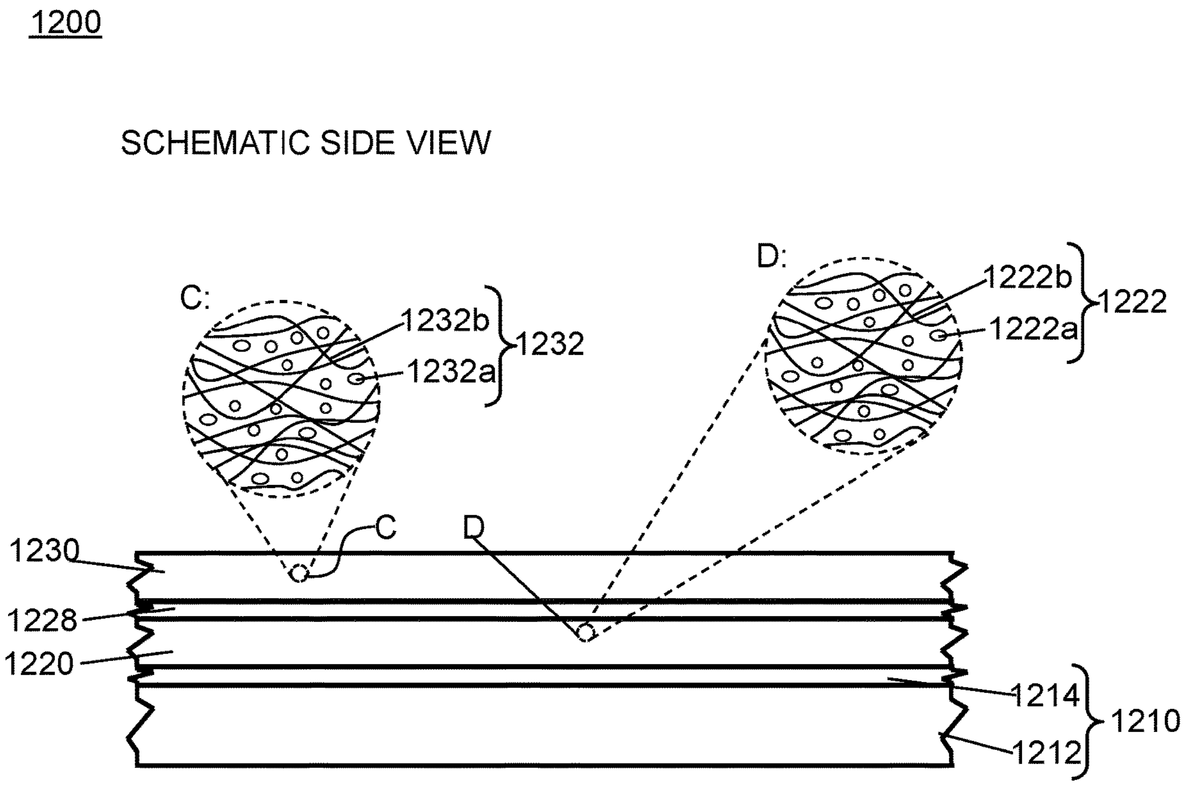
FIG. 12 is a schematic illustration of a side view of a sheet for thermal printing, the sheet including two layers formed of a plurality of particles including non-fiber particles and fibers, according to some embodiments of the invention.

Reference is made to FIG. 12, which is a schematic illustration of a side view of sheet 1200 for thermal printing, sheet 1200 including two layers 1220, 1230 formed of a plurality of particles including non-fiber particles and fibers, according to some embodiments of the invention.

Sheet 1200 for thermal printing may include a first layer 1210, a second layer 1220 and a third layer 1230. First layer 1210 and second layer 1220 may be dyed in different colors (e.g., as described hereinbelow) thus allowing colored thermal printing.

First layer 1210 may include a sheet material 1212. Sheet material 1212 that may include a paper, a film, a canvas or any other suitable sheet material. First layer 1210 may be dyed in a first specific color. For example, first layer 1210 may include a dye 1214 of the first specific color disposed on a surface of sheet material 1212 of first layer 1210. First layer 1210 may be similar to first layer 110 described hereinabove.

Second layer 1220 may be coextensive with first layer 1210. Second layer 1220 may be disposed on a surface of first layer 1210. Second layer 1220 may include a plurality of particles 1222. Particles 1222 may include non-fiber particles 1222*a* (e.g., such as non-fiber particles 1122*a* described hereinabove) and fibers 1222*b* (e.g., such as fibers 1122*b* described hereinabove). Second layer 1220 may be dyed in a second specific color. For example, a dye 1228 of the second specific color may be disposed on a surface of second layer 1220. The second specific color of second layer 1220 may be different from the first specific color of first layer 1210.

Third layer 1230 may be coextensive with second layer 1220. Third layer 1230 may be disposed on a surface of second layer 1220. Third layer 1230 may include a plurality of particles 1232. Particles 1232 may include non-fiber particles 1232*a* (e.g., such as non-fiber particles 1122*a* described hereinabove) and fibers 1232*b* (e.g., such as fibers 1122*b* described hereinabove). Particles 1232 of third layer 1230 may be formed of a material having the melting temperature that is different from the melting temperature of the material from which particles 1222 of second layer 1220 are formed.

Particles 1232 of third layer 1230 may melt before particles 1222 of second layer when a pulse of heat is sent onto sheet 1200. The number of particles 1222 in second layer 1220 and particles 1232 in third layer 1230 and/or the density of particles 1222 in second layer 1220 and particles 1232 in third layer 1230 and/or the spatial arrangement of particles 1222 in second layer 1220 and particles 1232 in third layer 1230 and/or the ratio of non-fiber particles 1222*a* over fibers 1222*b* in second layer 1220 and/or the ratio of non-fiber particles 1232*a* over fibers 1232*b* in third layer 1230 and/or any other suitable parameter of sheet 1200 may be set to cause particles 1232 of third layer 1230 to melt before particles 1222 of second layer when a pulse of heat is applied to sheet 1200.

In operation, a thermal printer may send a pulse of heat onto a selected region of sheet 1200 to heat third layer 1230 in the selected region and cause the selected region to appear substantially in the second specific color (e.g., as described above with respect to FIGS. 11C, 11D and 11E). If desired, the power of the heat pulse may be increased to heat second layer 1220 in the selected region and cause the selected region to appear substantially in the first specific color and/or in a combination of the first specific color and the second specific color (e.g., as described above with respect to FIGS. 11C, 11D and 11E).

While two layers 1220, 1230 with particles 1222, 1232, respectively, are shown, sheet 1200 may include any suitable number of layers with particles (e.g., three or more layers) wherein each of the layers may be dyed in a different color as compared to the other layers.

Sheets 1100, 1200 may be formed using any one of systems and methods described hereinabove or any suitable combination of the described systems and methods and/or any other suitable systems and methods.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of forming a sheet for thermal printing, the method comprising:
- forming fibers from a piece of material;
- breaking the fibers to form particles;
- preparing a dispersion of the particles in a liquid;
- applying a layer of the dispersion on a sheet material;
- drying the sheet material and the applied layer; and
- adhering the applied layer to the sheet material to form the sheet for thermal printing, wherein the particles in the adhered layer are randomly and evenly arranged per a thickness unit and per an area unit of the layer.

2. The method of claim 1, wherein the piece of material is formed of a polymeric material.

3. The method of claim 1, wherein forming the fibers is by an extrusion head.

4. The method of claim 1, comprising, prior to preparing the dispersion, refining the size of the particles.

5. The method of claim 1, wherein applying the layer of the dispersion on the sheet material is by a rotatable shaft, the rotatable shaft being partly placed within a container containing the dispersion.

6. The method of claim 1, comprising, prior to drying, removing the excess dispersion from the sheet material.

7. The method of claim 6, wherein removing is by an air knife.

8. The method of claim 1, wherein adhering is by a calendaring device.

9. The method of claim 1, wherein the sheet material is selected from a paper, a film and a canvas.

10. The method of claim 1, wherein a thickness of the adhered layer is within a range of 8 to 10 μm.

11. A method of forming a sheet for thermal printing, the method comprising:
- forming a plurality of fibers from a piece of material;
- arranging the fibers in a layer by passing gas on opposing sides of the layer in a conduit, the fibers being randomly intertwined and evenly arranged per a thickness unit and per an area unit of the layer;

placing the layer of the fibers on a sheet material; and adhering the layer of the fibers to the sheet material to form the sheet for thermal printing.

12. The method of claim 11, wherein forming the plurality of fibers is by an extrusion head.

13. The method of claim 11, wherein arranging the fibers in the layer is further by a shaft rotatable about an axis, the shaft including a plurality of needles projecting from a surface of the shaft.

14. The method of claim 13, wherein the shaft includes a plurality of rings arranged along the axis of the shaft adjacent to each other, each of the rings comprising a subset of the plurality of needles, and the method comprises:

rotating at least one of the plurality of the rings at a different rotational speed and/or in a different direction as compared to adjacent rings of the plurality of rings.

15. The method of claim 11, wherein adhering is by a calendaring device.

16. A method of forming a sheet for thermal printing, the method comprising:

forming a plurality of fibers from a piece of material;

dispersing the fibers in a liquid;

simultaneously squeezing the liquid from the fibers and arranging the fibers in a layer, the fibers being randomly intertwined and evenly arranged per a thickness unit and per an area unit of the layer;

placing the layer of the fibers on a sheet material; and adhering the layer of the fibers to the sheet material to form the sheet for thermal printing.

17. The method of claim 16, wherein forming the plurality of fibers is performed by an extrusion head.

18. The method of claim 16, wherein squeezing and arranging the fibers in the layer is by pressing the fibers against a rotatable mesh shaft.

19. The method of claim 18, wherein adhering is by a calendaring device.

* * * * *